United States Patent
Kim et al.

(10) Patent No.: US 9,812,168 B2
(45) Date of Patent: Nov. 7, 2017

(54) ELECTRONIC DEVICE AND METHOD FOR PLAYING BACK IMAGE DATA

(71) Applicant: Samsung Electronics Co., Ltd., Gyeonggi-do (KR)

(72) Inventors: Doo-Hyun Kim, Seoul (KR); Jae-Hyun Kim, Gyeonggi-do (KR); Byeong-Jun Kim, Seoul (KR); Sang-Soo Park, Gyeonggi-do (KR); Jun-Soo Lee, Gyeonggi-do (KR); Ho-Chul Hwang, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 15/044,321

(22) Filed: Feb. 16, 2016

(65) Prior Publication Data

US 2016/0240223 A1 Aug. 18, 2016

(30) Foreign Application Priority Data

Feb. 16, 2015 (KR) .................. 10-2015-0023706

(51) Int. Cl.
*H04N 9/80* (2006.01)
*H04N 5/93* (2006.01)
*G11B 27/031* (2006.01)

(52) U.S. Cl.
CPC ................. *G11B 27/031* (2013.01)

(58) Field of Classification Search
USPC ........................................ 386/239–248, 285
See application file for complete search history.

(56) References Cited

U.S. PATENT DOCUMENTS

| | | | | |
|---|---|---|---|---|
| 6,901,362 | B1 * | 5/2005 | Jiang | G10L 25/48 704/208 |
| 2004/0179811 | A1 * | 9/2004 | Kikkawa | H04N 5/4401 386/248 |
| 2005/0276575 | A1 * | 12/2005 | Murayama | H04N 5/4401 386/212 |
| 2006/0078287 | A1 * | 4/2006 | Cheng | G11B 27/034 386/271 |
| 2009/0006102 | A1 * | 1/2009 | Kan | G10L 25/00 704/500 |
| 2010/0004926 | A1 * | 1/2010 | Neoran | G10L 25/48 704/201 |

(Continued)

FOREIGN PATENT DOCUMENTS

| KR | 10-2010-0002090 A | 1/2010 |
|---|---|---|
| KR | 10-2011-0064901 A | 6/2011 |
| KR | 10-2014-0090469 A | 7/2014 |

*Primary Examiner* — Hung Dang
(74) *Attorney, Agent, or Firm* — Cha & Reiter, LLC

(57) ABSTRACT

The present disclosure provides an electronic device and method for playing image data. The method for playing back image data in an electronic device includes storing an audiovisual (A/V) data for a predetermined period of time in a memory of the electronic device. The electronic device plays back the A/V data, wherein upon playing back, by the electronic device, the A/V data comprises analyzing an audio signal of the A/V data dynamically to select one of a plurality of sound effects based on the analyzed audio signal. The A/V data is played back by applying the selected sound effect to at least a part of the A/V signal.

18 Claims, 8 Drawing Sheets

(56) References Cited

U.S. PATENT DOCUMENTS

| | | |
|---|---|---|
| 2010/0008641 A1 | 1/2010 | Murabayashi |
| 2010/0109926 A1* | 5/2010 | Medina ................ G11B 27/034 341/144 |
| 2011/0289544 A1* | 11/2011 | Goosen .............. H04N 21/4384 725/116 |
| 2012/0013801 A1* | 1/2012 | Oh ........................... H04N 5/45 348/469 |
| 2012/0206651 A1* | 8/2012 | Minoda ................. H04R 1/403 348/552 |

* cited by examiner

ELECTRONIC DEVICE AND METHOD FOR PLAYING BACK IMAGE DATA

CLAIM OF PRIORITY

This application claims the benefit under 35 U.S.C. §119(a) of priority from a Korean patent application filed in the Korean Intellectual Property Office on Feb. 16, 2015 and assigned Serial No. 10-2015-0023706, the entire disclosure of which is incorporated herein by reference.

BACKGROUND

Field of the Disclosure

The present disclosure provides an electronic device and method for playing back image data.

Description of the Related Art

Recent portable electronic devices provide more diverse services and optional functions than known heretofore. To improve the usefulness of such portable electronic devices and meet the different demands of users, various applications have been developed that may be operating in the portable electronic device.

With regard to the various applications, the portable electronic device may reproduce image data and analyze the reproduced image. As for a method for analyzing the image, an image processing algorithm, such as, for example, Speeded Up Robust Features (SURF), Scale Invariant Feature Transform (SIFT), or Random Sample Consensus (RANSAC) may be used to analyze objects and backgrounds in the image.

Conventional methods for analyzing images, however, suffer from long processing time because the analysis normally includes the operation of a number of computing processes, and the conventional methods carry a heavy burden because many learning processes and image information relating to objects and backgrounds from existing images should be stored.

Accordingly, a need exists to determine whether a particular data compilation is video or audio, and to analyze and divide scenes by analyzing audio signals of an image if the data is video, and enable the user to comfortably enjoy the image by automatically applying some effects to the scenes.

The above information is presented as background information only to assist a person of ordinary skill in the art with an understanding of the present disclosure. No determination has been made, and no assertion is made, as to whether any of the above might be applicable as prior art with regard to the present disclosure.

SUMMARY

Embodiments of the present disclosure provide an electronic device and method for playing back image data.

In accordance with an aspect of the present disclosure, a method for playing back image data in an electronic device is provided. The method includes temporarily (e.g. for a predetermined time period) storing, by the electronic device including a non-transitory memory, audiovisual (A/V) data in the memory; and playing back the A/V data by the electronic device; wherein when playing back the A/V data, by the electronic device, the method includes analyzing an audio signal of the A/V data dynamically; selecting one of a plurality of sound effects based on the analyzed audio signal; and playing back the A/V data while applying the selected sound effect to at least a part of the A/V signal.

In accordance with another aspect of the present disclosure, an electronic device for playing back image data is provided. The electronic device includes a transceiver for transmitting/receiving image data; a non-transitory memory for storing the image data; a controller comprising one or more processors having circuitry that analyzes an audio signal from the image data, selecting a mode to be applied to the image data based on the analyzed audio signal, and applying the selected mode to the image data; and an output unit for playing back the image data with the selected mode applied thereto.

In accordance with another aspect of the present disclosure, a computer-readable storage medium having a program embodied thereon to operate an electronic device is provided. The program includes instructions that when executed by one or more processors of the electronic device operates the electronic device for: a first instruction set for temporarily storing audiovisual (A/V) data in a memory; and a second instruction set for playing back the A/V data, by the electronic device, wherein the second instruction set comprises a third instruction set for analyzing an audio signal of the A/V data dynamically; a fourth instruction set for selecting one of a plurality of sound effects based on the analyzed audio signal; and a fifth instruction set for playing back the A/V data while applying the selected sound effect to at least a part of the A/V signal.

BRIEF DESCRIPTION OF THE DRAWINGS

The above and other aspects, features and advantages of certain exemplary embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
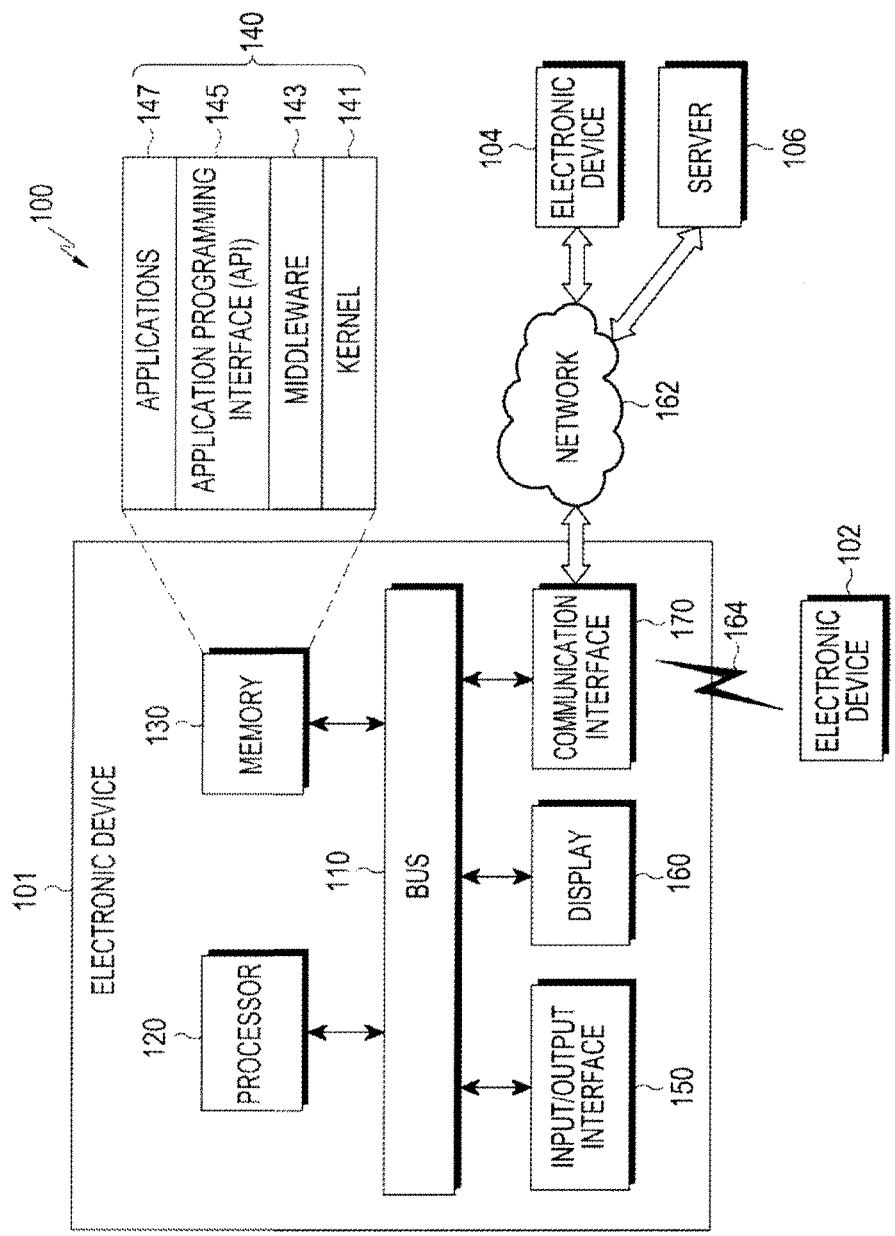
FIG. 1 shows a block diagram of an electronic device in a network environment, according to various embodiments of the present disclosure.

The following description provides various embodiments of the present disclosure for illustrative purposes with reference to the accompanying drawings. This disclosure, which includes the appended claims, should not be construed as limited to the embodiments expressly set forth herein, and may be understood as including their modifications, equivalents, and/or alternatives. Like numbers refer to like elements throughout the drawings.

The terms "have", "having", "comprise", or "comprising" as herein used specify the presence of disclosed functions, operations, or components, but do not preclude the presence or addition of one or more other functions, operations, or components.

As used herein, the term "A or B", "at least one of A and/or B", or "one or more of A and/or B" includes any and all combinations of one or more of the associated listed items. For example, "A or B", "at least one of A and B", or "at least one of A or B" may indicate (1) at least A, (2) at least B, or (3) at least A and at least B.

Ordinal terms like 'first', 'second', etc., may be used to indicate various components, but the meaning of such components in the appended claims should not be restricted by the use of such ordinal terms. These terms are only used to distinguish one element, component, region, layer or section from another element, component, region, layer or section. For example, a first user equipment (UE) and second UE may refer to different UEs irrespective of their order or importance. For example, the first component may be termed as the second component, and vice versa, within the scope of the present invention.

When it is said that a component (e.g., first component) is operatively or communicatively coupled with/to or connected to another component (e.g., second component), it is to be understood that the first component may be directly connected or coupled to the second component or may be indirectly connected or coupled to the second component via another new component (e.g., third component, or even via a network). However, if a component (e.g., first component) is said to be "directly connected" or "directly coupled" to another component (e.g., second component), it should be interpreted that there is no component (e.g., third component) between the two components.

The expression "configured to" as herein used may be interchangeably used with "suitable for", "having the capacity to", "designed to", "adapted to", "made to", or "capable of" according to the given situation. The expression "configured to" may not necessarily mean "specifically designed to" in terms of hardware. Rather, it may refer to "able to cooperate with" another component or part under a certain situation. For example, "a processor configured to perform A, B and C functions" may refer to a dedicated processor including integrated circuitry, e.g., an embedded processor for performing A, B and C functions, or a general purpose processor, e.g., a Central Processing Unit (CPU) or an application processor including hardware that may perform A, B and C functions by executing one or more software programs stored in a memory.

Terms as herein used for the purpose of explaining some embodiments of the present disclosure are not intended to limit the present disclosure including the appended claims to only the embodiments expressly shown and described herein. As used herein, the singular forms "a", "an" and "the" are intended to include the plural forms as well, unless the context clearly indicates otherwise. All terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. The terminology used herein is for the purpose of describing particular embodiments only and is not intended to be limiting of the embodiments of the present disclosure. It should also be understood that unless expressed otherwise to the contrary, elements of one embodiment may be used with elements of one or more other embodiments.

An electronic device according to various embodiments of the present disclosure may include, for a non-limiting example, at least one of smart phones, tablet Personal Computers (PCs), mobile phones, video phones, e-book readers, desktop PCs, laptop PCs, netbook computers, workstations, servers, Personal Digital Assistants (PDAs), Portable Multimedia Players (PMPs), MP3 players, mobile medical devices, cameras, and wearable devices. In various embodiments, the wearable devices may include at least one of accessory typed devices (e.g., watches, rings, bracelets, anklets, necklaces, glasses, contact lenses, or Head-Mounted Devices (HMDs)), cloth or clothing typed devices (e.g., electronic clothing), body-attachable devices (e.g., skin pads or tattoos), and implantable circuits.

In some embodiments, the electronic device may be a home appliance. The home appliance may include at least one of e.g., televisions, Digital Video Disc (DVD) players, audio systems, refrigerators, air conditioners, cleaning machines, ovens, microwaves, washing machines, air purifiers, set-top boxes, home automation control panels, security control panels, TV sets (e.g., Samsung HomeSync™, Apple TV™, or Google TV™), game consoles (e.g., Xbox™ PlayStation™), electronic dictionaries, electronic keys, camcorders, and electronic albums.

In some embodiments, the electronic device may include at least one of a variety of medical equipment (e.g., various portable medical meters (e.g., blood sugar meters, heart rate meters, blood pressure meters, clinical thermometers, etc.), Magnetic Resonance Angiography (MRA), Magnetic Resonance Imaging (MRI), Computed Tomography (CT), photographing devices, ultrasonic devices, etc.), navigation devices, Global Navigation Satellite Systems (GNSSs), Event Data Recorders (EDRs), Flight Data Recorders (FDRs), car infotainment devices, marine electronic devices (e.g., marine navigation systems, gyro-compass, etc.), avionics, security devices, car head units, industrial or home robots, banking agency's Automatic Teller Machines (ATMs), Point of Sales (POSs) for shops, and devices for Internet of things (e.g., bulbs, various sensors, electricity or gas meters, sprinklers, fire alarms, thermostats, street lamps, toasters, health machines, hot-water tanks, heaters, boilers, etc.).

In some embodiments, the electronic device may include at least one of furniture or part of a building/structure, electronic boards, electronic signature receiving devices, projectors, and various instrumental equipment (e.g., meters for water, electricity, gas, or radio waves). The electronic device in accordance with various embodiments of the present disclosure may be a combination of one or more of the aforementioned devices. In some embodiments, the electronic device may be a flexible electronic device. The electronic device is not limited to the above description, but may include a device that would emerge in the future with the advancement of technology.

An electronic device according to various embodiments of the present disclosure will now be described with reference to accompanying drawings. The term "user" as herein used may refer to a person who uses the electronic device or a device (e.g., an artificially intelligent device) that uses the electronic device.

FIG. 1 shows an electronic device in a network environment, according to various embodiments of the present disclosure;

The electronic device 101 may include a bus 110, a processor 120, a non-transitory memory 130, an input/output (I/O) interface 150, a display 160, and a communication interface 170. In some embodiments, the electronic device 101 may omit at least one of the components, or may additionally include some other component(s).

The bus 110 may include a circuit to connect the components 110 to 170 to one another, and deliver communications (e.g., control commands and/or data) among the components 110 to 170.

The processor 120 may include one or more of CPUs, Application Processors (APs) or Communication Processors (CPs). The processor 120 may include circuitry to perform operations or data processing related to control and/or communications of at least one of the other components of the electronic device 101, or another device in communication with the electronic device 101.

The non-transitory memory 130 may include volatile and/or nonvolatile memories. The non-transitory memory 130 may store commands or data related to at least one of the other components of the electronic device 101. In an embodiment, the non-transitory memory 130 may store software and/or a program 140. The program 140 may include, for example, kernel 141, middleware 143, Application Programming Interface (API) 145, application programs (applications) 147, and/or the like. At least a part of the kernel 141, middleware 143, or API 145 may be referred to as an Operating System (OS).

The kernel 141 may control or manage system resources (e.g., the bus 110, the processor 120, the non-transitory memory 130 or the like) to be used to perform an operation or function implemented by the other programming modules, e.g., the middleware 143, the API 145, or the application programs 147. Furthermore, the kernel 141 may provide an interface for the middleware 143, the API 145, or the application programs 147 to access respective components of the electronic device 101 to control or manage system resources.

The middleware 143 may act as intermediary for the API 145 or the application programs 147 to communicate data with the kernel 141. Furthermore, the middleware 143 may handle one or more requests for tasks received from the application programs 147 in order of priority. For example, the middleware 143 may give priority to at least one of the application programs 147 in using system resources (e.g., the bus 110, the processor 120, the non-transitory memory 130, or the like) of the electronic device 101. For example, the middleware 143 may perform scheduling or load balancing on one or more requests for tasks by handling the one or more requests for tasks according to priorities given to the at least one of them.

The API 145 is, for example, an interface for the applications 147 to control a function provided from the kernel 141 or the middleware 143, and may include at least one interface or function (e.g., an instruction) for e.g., file control, window control, image processing, text control, etc.

The I/O interface 150 may serve as an interface to deliver commands or data input from e.g., the user or an external device to other component(s) of the electronic device 101. The I/O interface 150 may also output commands or data received from the other component(s) of the electronic device 101 to the user or other electronic device(s).

The display 160 may include e.g., a Liquid Crystal Display (LCD), a Light Emitting Diode (LED) display, an organic LED (OLED) display, Micro-Electromechanical System (MEMS) display, or an electronic paper display. The display 160 may display various contents, e.g., text, images, video, icons, symbols, etc., for the user. The display 160 may include, for example, a touch screen, which may detect touches, gestures, proximity or hovering inputs by way of an electronic pen or a body part of the user.

The communication interface 170 typically includes hardware for wired or wireless transmission (such as a transmitter, receiver, transceiver, antenna(s) or antenna array) and may establish communication between the electronic device 101 and an external electronic device, e.g., the first external electronic device 102, the second external electronic device 104 or the server 106. For example, the communication interface 170 may be connected to a network 162 through wired or wireless communication and may communicate with the external electronic device 104 or the server 106.

The wireless communication corresponds to e.g., a cellular communication protocol, using at least one of e.g., Long-Term Evolution (LTE), LTE-Advanced (LTE-A), Code Divisional Multiplexing Access (CDMA), Wideband CDMA WCDMA, Universal Mobile Telecommunications System (UMTS), Wireless Broadband (WiBro), Global System for Mobile Communications (GSM), etc. The wireless communication may also include short-range communication 164. The short-range communication 164 may include at least one of e.g., Wireless Fidelity, Bluetooth, Near Field Communication (NFC), GNSS, etc. The GNSS may include at least one of e.g. Global Positioning System (GPS), Global Navigation Satellite System (Glonass), and Beidou Navigation Satellite System (hereinafter, also called "Beidou" or Galileo, the European global satellite-based navigation system). In the following description, "GPS" may be interchangeably used with "GNSS". The wired communication may include at least one of e.g., Universal Serial Bus (USB), High Definition Multimedia Interface (HDMI), Recommended Standard (RS) 232, Plain Old Telephone Service (POTS), and the like. The network 162 may include at least one of telecommunication networks, e.g., computer networks (e.g., Local Area Network (LAN) or Wide Area Networks (WAN)), the Internet, and telephone networks.

Each of the first and second external electronic devices 102 and 104 may or may not be of the same type as that of the electronic device 101. In an embodiment, the server 106 may include a group of one or more of servers. In various embodiments, all or a part of the operations executed in the electronic device 101 may also be executed in one or more of other electronic devices, e.g., 102, 104, or in the server 106. Distributed processing is within operable scope of the network environment shown in FIG. 1. In an embodiment, when the electronic device 101 needs to perform a function or service automatically or on request, the electronic device 101 may request another device, e.g., the electronic device 102 or 104, or the server 106 to perform at least a part of the function or service, instead of or in addition to performing the function or the service by itself. The other electronic device e.g., 102 or 104 or the server 106 may perform the requested function or service, and send the results to the electronic device 101. The electronic device 101 may provide the function or the service by processing the received results intact or additionally. For this, for example, cloud computing, distributed computing, or client-server computing may be used.

Figure 2:
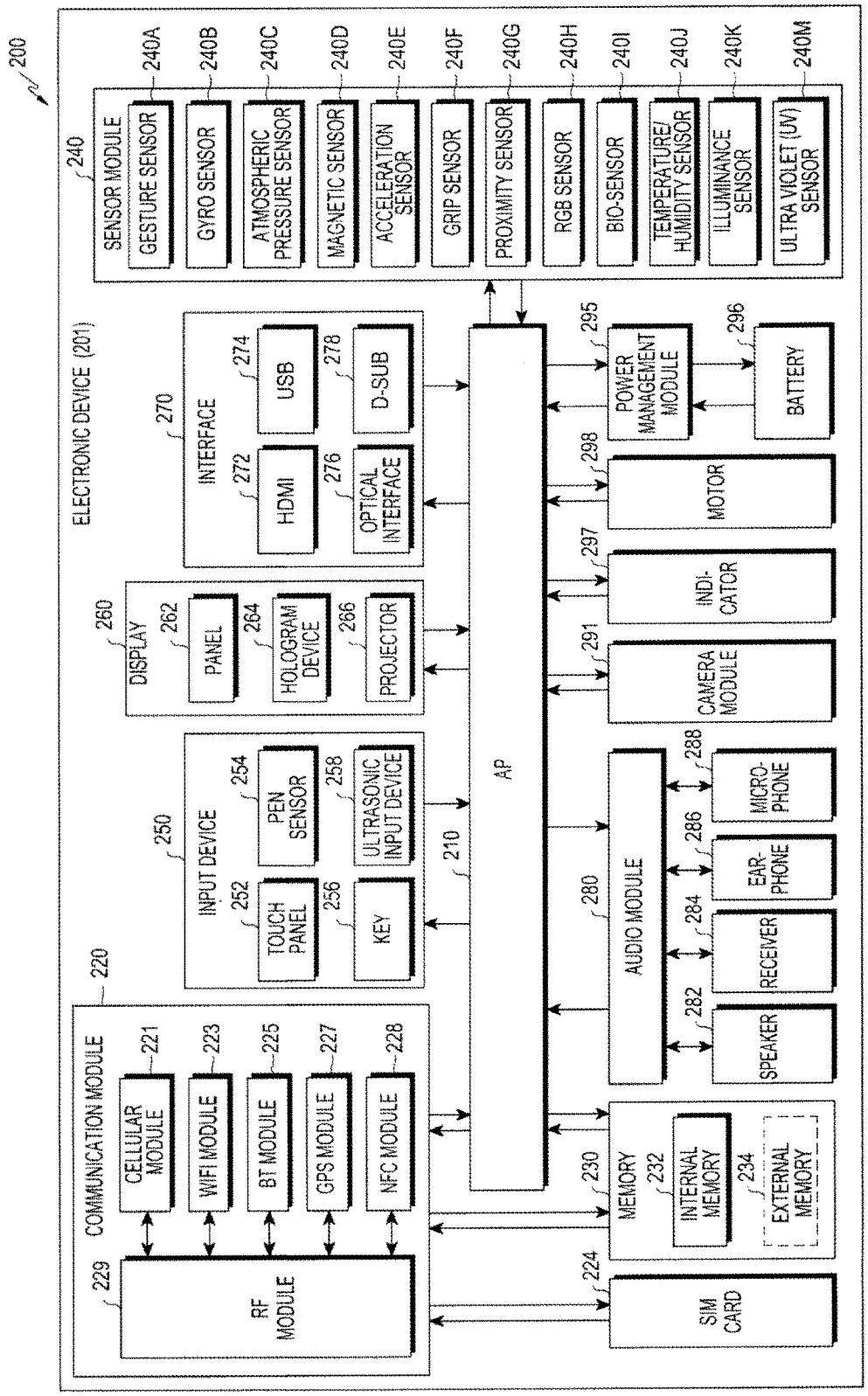
FIG. 2 is a block diagram of an electronic device, according to various embodiments of the present disclosure.

FIG. 2 is a block diagram of an electronic device, according to various embodiments of the present disclosure.

An electronic device 201 may include a part or all of e.g., the electronic device 101 shown in FIG. 1. For example, the electronic device 201 may include one or more processors (e.g., APs) 210, a communication module 220, a Subscriber Identification Module (SIM) card 224, a memory 230, a sensor module 240, an input device 250, a display 260, an interface 270, an audio module 280, a camera module 291, a power manager module 295, a battery 296, an indicator 297, and a motor 298.

The processor 210, which includes hardware such as integrated circuitry, may control the hardware and software components that are connected to the processor 210 by running e.g., an operating system or several application programs, and perform data processing and operation. The processor 210 may be implemented in e.g., a System on Chip (SoC). In accordance with an embodiment, the processor 210 may further include a Graphic Processing Unit (GPU) and/or an image signal processor. The processor 210 may also include at least a part of the components shown in FIG. 2, e.g., a cellular module 221. The processor 210 may process a command or data received from at least one of the other components, e.g., a nonvolatile memory to be loaded onto a volatile memory, and store various types of data in the nonvolatile memory.

The communication module 220 may be configured in the same or a similar way to the communication interface 170 of FIG. 1. The communication module 220 may include the cellular module 221, a Wi-Fi module 223, a Bluetooth module 225, a GNSS module 227 (e.g., GPS module, Glonass module, Beidou module, or Galileo module, a Near Field Communication (NFC) module 228, and a Radio Frequency (RF) module 229.

The cellular module 221 may provide e.g., voice call, video call, texting, and/or Internet services over a communication network. In an embodiment, the cellular module 221 may also identify and authenticate the electronic device 201 in the communication network in cooperation with the SIM card 224. In accordance with an embodiment, the cellular module 221 may perform at least a part of functions that the AP 210 may provide. In an embodiment, the cellular module 221 may include a CP.

The Wi-Fi module 223, the Bluetooth module 225, the GNSS module 227, and the NFC module 228 may each include a processor for processing data sent or received through the corresponding module. In an embodiment, at least some (e.g., two or more) of the cellular module 221, the Wi-Fi module 223, the Bluetooth module 225, the GNSS module 227, and the NFC module 228 may be integrated in a single Integrated Circuit or an IC package.

The RF module 229 may transmit and/or receive communication signals, e.g., RF signals via an antenna. The RF module 229 may include e.g., a transceiver, a Power Amp Module (PAM), a frequency filter, a Low Noise Amplifier (LNA), or an antenna. In another embodiment, at least one of the cellular module 221, the Wi-Fi module 223, the Bluetooth module 225, the GNSS module 227, and the NFC module 228 may transmit and/or receive RF signals through a separate RF module.

The SIM card 224 may include a card including a subscriber identification module and/or an embedded SIM, and include unique identification information, e.g., an Integrated Circuit Card Identifier (ICCID) or an International Mobile Subscriber Identity (IMSI).

The non-transitory memory 230 (corresponding to the non-transitory memory 130) may include e.g., one or both of an internal memory 232 or an external memory 234. The internal memory 232 may include e.g., at least one of a volatile memory, such as Dynamic Random Access Memory (DRAM), Static RAM (SRAM), Synchronous Dynamic RAM (SDRAM), or the like, a non-volatile memory, such as One Time Programmable Read Only Memory (OTPROM), Programmable ROM (PROM), Erasable and Programmable ROM (EPROM), Electrically Erasable and Programmable ROM (EEPROM), mask ROM, flash ROM, NAND flash memory, Nor flash memory, or the like, a hard driver, and a Solid State Driver (SSD).

The external memory 234 may further include a flash drive, such as compact flash (CF), secure digital (SD), micro secure digital (Micro-SD), mini secure digital (Mini-SD), extreme digital (xD), multimedia card (MMC), memory stick, or the like. The external memory 234 may be operationally and/or physically connected to the electronic device 201 through various interfaces.

The sensor module 240 may measure e.g., a physical quantity or convert information measured or detected by monitoring the electronic device 201 to an electric signal. The sensor module 240 may include at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H such as an RGB (Red, Green, Blue) sensor, a bio sensor 240I, a temperature/humidity sensor 240J, an illumination sensor 240K, and an Ultra Violet (UV) sensor 240M. Additionally or alternatively, the sensor module 240 may include an E-nose sensor, an electromyography (EMG) sensor, an electroencephalogram (EEG) sensor, an electrocardiogram (ECG) sensor, an infrared (IR) sensor, an iris sensor, a finger print sensor, or the like. The sensor module 240 may further include a control circuit for controlling at least one or more of the sensors included in the sensor module 540. In some embodiments, the electronic device 201 may further include a processor configured to control the sensor module 240 as a part of or separate from the processor 210, to control the sensor module 240 while the processor 210 is in sleep state.

The input device 250 may include e.g., a touch panel 252, a (digital) pen sensor 254, a key 256, or an ultrasonic input device 258. The touch panel 252 may employ at least one of a capacitive, resistive, infrared, and ultrasonic method.

The touch panel 252 may further include a control circuit. The touch panel 252 may further include a tactile layer for providing the user with haptic sensation.

The (digital) pen sensor 254 may be e.g., a part of the touch panel 252, or include a separate sheet for recognition. The key 256 may include e.g., a physical button, optical key or key pad. The ultrasonic input device 258 may detect ultrasounds originated from an input tool through a microphone (e.g., microphone 288) to determine data corresponding to the detected ultrasounds.

The display 260 (corresponding to the display 160) may be constructed via Thin Film Technology (TT), and/or include a panel 262, a hologram device 264, or a projector 266. The panel 262 may be configured in the same or a similar way to the display 160 of FIG. 1. The panel 262 may be implemented to be flexible, transparent, or wearable. The panel 262 may also be incorporated with the touch panel 1152 in a single module. The hologram device 264 may make three dimensional (3D) images (holograms) in the air by using light interference. The projector 266 may display an image by projecting light onto a screen. The screen may be, for example, located inside or outside of the electronic device 201. In accordance with an embodiment, the display 260 may further include a control circuit to control the panel 262, the hologram device 264, or the projector 266.

The interface 270 may include e.g., a High Definition Multimedia Interface (HDMI) 272, a Universal Serial Bus (USB) 274, an optical interface 276, or a D-subminiature (D-sub) 278. The interface 270 may be included in e.g., the communication interface 170 shown in FIG. 1. Additionally or alternatively, the interface 270 may include a Mobile High-definition Link (MHL) interface, a secure digital (SD) card/multimedia card (MMC) interface, or Infrared Data Association (IrDA) standard interface.

The audio module 280 may convert between sound and electric signals. At least a part of the audio module 280 may be included in e.g., the I/O interface 145 as shown in FIG. 1. The audio module 280 may comprises hardware, such as a processor or microprocessor, may process sound information input or output through e.g., a speaker 282, a receiver 284, an earphone 286, or a microphone 288.

The camera module 291 may be a device for capturing e.g., still images and videos, and may include, in an embodiment, one or more image sensors (e.g., front and back sensors), a lens, an Image Signal Processor (ISP), or a flash such as an LED or xenon lamp.

The power manager module 295 may, for example, manage power of the electronic device 201. In an embodiment, a Power Management Integrated Circuit (PMIC), a charger IC, or a battery or fuel gauge may be included in the power manager module 295. The PMIC may have wired and/or wireless charging schemes. The wireless charging scheme may include e.g., a magnetic resonance scheme, a magnetic induction scheme, or an electromagnetic wave based scheme, and an additional circuit, such as a coil loop, a resonance circuit, a rectifier, or the like may be added for wireless charging. The battery fuel gauge may measure an amount of remaining power of the battery 696, a voltage, a current, or a temperature while the battery 296 is being charged. The battery 296 may include, e.g., a rechargeable battery or a solar battery.

The indicator 297 may indicate a particular state of the electronic device 201 or a part of the electronic device (e.g., the processor 210), the particular state including e.g., a booting state, a message state, or charging state. The motor 298 may convert an electric signal to a mechanical vibration, and produce vibration or haptic effects. Although not shown, a processing unit for supporting mobile TV, such as a GPU may be included in the electronic device 201. The processing unit for supporting mobile TV may process media data conforming to a standard for Digital Multimedia Broadcasting (DMB), Digital Video Broadcasting (DVB), or mediaFLo™.

Each of the aforementioned components of the present disclosure may include one or more components, and a name of the component may vary with a type of the electronic device. The electronic device in accordance with various embodiments of the present disclosure may include at least one of the aforementioned components, omit some of them, or include other additional component(s). Some of the components may be combined into an entity, but the entity may perform the same functions as the components may each do.

Figure 3:
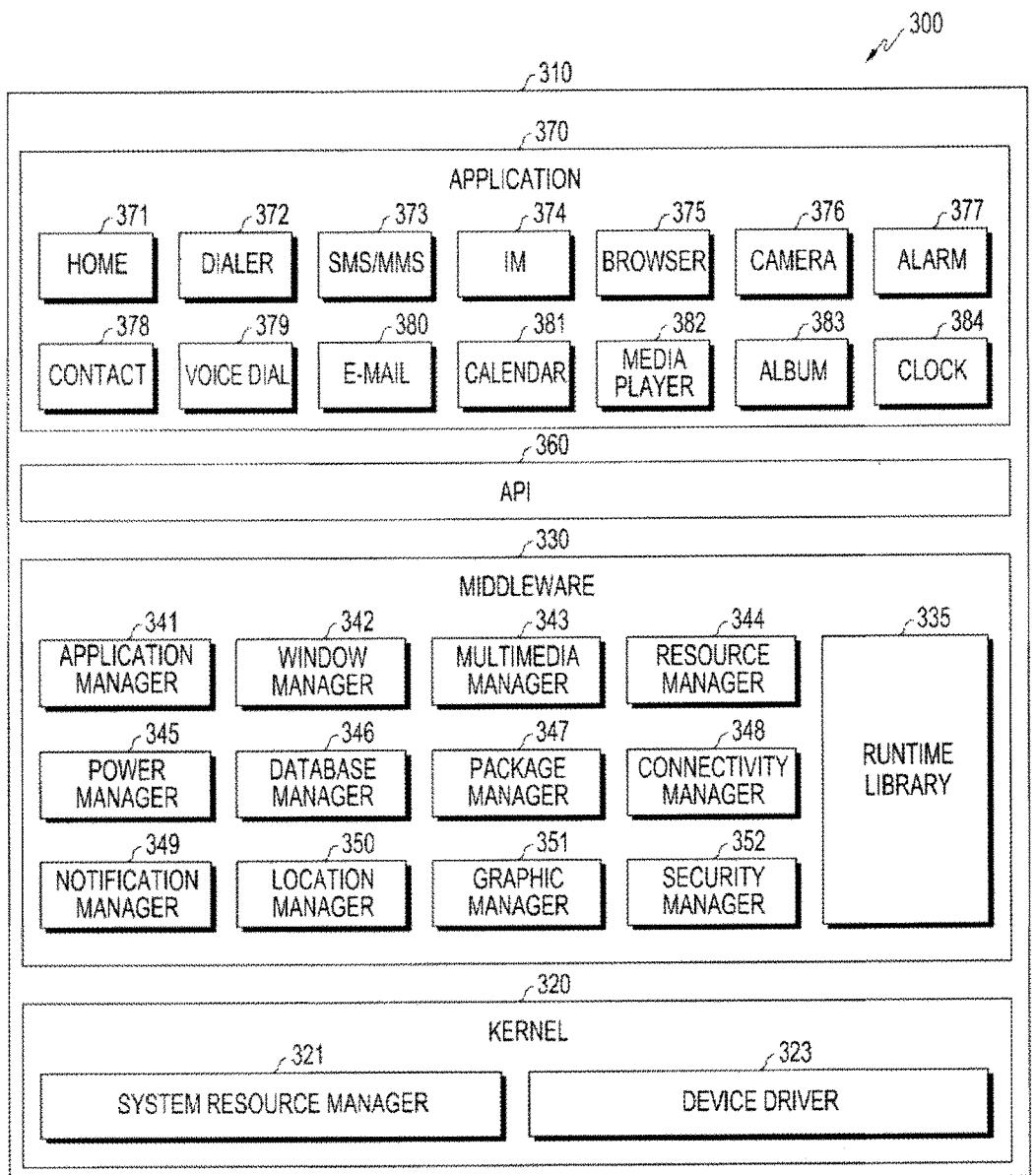
FIG. 3 is a block diagram of a program module, according to various embodiments of the present disclosure.

FIG. 3 is a block diagram of a program module, according to various embodiments of the present disclosure.

With reference to FIG. 3, the program module 310 (corresponding to the program 140) may include an Operating System (OS) for controlling resources associated with an electronic device, e.g., the electronic device 101, and/or various applications (e.g., including the application programs 147) running under the OS. The OS may be e.g., Android, iOS, Windows, Symbian, Tizen, Bada, or like.

The program module 310 may include a kernel 320, a middleware 330, an API 360, and/or applications 370. At least a part of the program module 310 may be preloaded onto the electronic device, or may be downloaded from an external electronic device, e.g., the electronic device 102 or 104, or the server 106.

The kernel 320, e.g., the kernel 141 of FIG. 1 may include e.g., a system resource manager 321, and/or a device driver 323. The system resource manager 321 may perform control, allocation or retrieval of the system resource. In an embodiment, the system resource manager 321 may include a process manager, a memory manager, a file system manager, or the like. The device driver 323 may include e.g., a display driver, a camera driver, a Bluetooth driver, a shared memory driver, a USB driver, a keypad driver, a Wi-Fi driver, an audio driver, or an Inter-Process Communication (IPC) driver.

The middleware 330 may e.g., provide a function commonly required by the applications 370, or provide the applications 370 with various functions through the API 360 for the applications 370 to efficiently use limited system resources in the electronic device. In an embodiment, the middleware 330 (corresponding to the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include a library module used by a compiler to add a new function through a programming language while e.g., the applications 370 are running. The runtime library 335 may perform input/output management, memory management, or arithmetic functions.

The application manager 341 may manage a life cycle of at least one application among e.g., the applications 370. The window manager 342 may manage GUI resources used for the screen. The multimedia manager 343 may determine a format required to reproduce various media files, and perform encoding or decoding of the media file with a codec that conforms to the format. The resource manager 344 may manage resources, such as source codes of at least one of the applications 370, memory or storage capacity, etc.

The power manager 345 may operate with e.g., a Basic Input/Output System (BIOS) to manage the battery or power and provide power information required for operation of the electronic device. The database manager 346 may create, search, or change a database to be used by at least one of the applications 370. The package manager 347 may manage installing or updating of an application distributed in the form of a package file.

The connectivity manager 348 may manage wireless connection, e.g., Wi-Fi or Bluetooth. The notification manager 349 may display or notify an event, such as message arrival, appointment, proximity, etc., in a way not to disturb the user. The location manager 350 may manage location information of the electronic device. The graphic manager 351 may manage graphic effects or associated user interface to be provided to the user. The security manager 352 may provide an overall security function required for system security, user authentication, or the like. In an embodiment, if an electronic device, e.g., the electronic device 101 includes a phone functionality, the middleware 330 may further include a telephony manager to manage voice or video call functions of the electronic device 101.

The middleware 330 may include a middleware module that may constitute any combination of various functions of the aforementioned components. The middleware 330 may provide a specialized module for each type of OS to provide a specialized function. Furthermore, the middleware 330 may dynamically delete some of the existing components or add new components.

The API 360 (corresponding to API 145) may be a set of API programming functions, and may be differently configured depending on the OS. For example, in case of Android or iOS, an API set may be provided for each platform, and in case of Tizen, two or more API sets may be provided for each platform.

The applications 370 (corresponding to the application programs 147) may include one or more applications that may provide functions or information about e.g., home 371, dialer 372, SMS/MMS 373, Instant Messaging (IM) 374, browser 375, camera 376, alarm 377, contacts 378, voice dial 379, email 380, calendar 381, media player 1782, album 383, clock 384, healthcare (e.g., amount of exercise or blood sugar measurement), environmental information (e.g., atmospheric pressure, temperature, etc.), or the like.

In an embodiment, the applications 370 may include an application that supports exchange of information between electronic devices (e.g., the electronic device 101 and the external electronic devices 102, 104). The application involved in such information exchange may include e.g., a notification relay application for relaying particular information to the external electronic device 104 or a device management application for managing the external electronic device 104.

For example, the notification relay application may include a functionality for notifying the external electronic device e.g., 102, 104 of notification information generated in any other application (e.g., the SMS/MMS application, the Email application, the healthcare application, or the environmental information application) of the electronic device e.g., 101. For example, the notification relay application may receive notification information from an external electronic device and provide the information to the user.

The device manager application may manage (e.g., install, delete or update) a function (e.g., turning on/off an external electronic device e.g., 102, 104 itself or a part of the external electronic device, or controlling display brightness of the external electronic device) of the external electronic device in communication with the electronic device e.g., 101, or a service (e.g., calling or messaging service) provided by the external electronic device or an application running in the external electronic device.

In an embodiment, the applications 370 may include an attribute (or an application designated according to the attribute) of an external electronic device, e.g., the electronic device 102 or 104 (e.g., a healthcare application of a mobile healthcare device). In an embodiment, the applications 370 may include an application received from the external electronic device, e.g., the server 106 or the electronic device 102, 104. In an embodiment, the applications 370 may include a preloaded application or a third party application that may be downloaded from a server. Terms of the components of the program module 310 may depend on types of OS.

In various embodiments, at least a part of the program module 310 may be implemented in software executed by hardware, firmware, hardware, or a combination of two or more of them. At least a part of the programming module 310 may be implemented or run by a processor, e.g., the processor 210. At least a part of the programming module 310 may include e.g., a module, program, routine, set of instructions, process, or the like for performing one or more functions. Under the broadest reasonable interpretation, none of the elements herein are software per se or pure software.

The term 'module' may refer to a unit including one of hardware, software, and firmware, or a combination thereof. The term 'module' may be interchangeably used with a unit, logic, logical block, component, or circuit. The module may be a minimum unit or part of an integrated component. The module may be a minimum unit or part of performing one or more functions. The module may be mechanically or electrically implemented. For example, the module may include at least one of Application Specific Integrated Circuit (ASIC) chips, Field Programmable Gate Arrays (FPGAs), or Programmable Logic Arrays (PLAs) that perform some operations, which have already been known or will be developed in the future.

At least a part of the device (e.g., modules or their functions) or method (e.g., operations) may be implemented as instructions stored in a computer-readable storage medium e.g., in the form of a program module. The instructions, when executed by one or more processors (e.g., the processor 120), may cause the processor to perform or control a corresponding function. The computer-readable storage medium may be e.g., the memory 130.

The computer-readable storage medium may include a hard disk, a floppy disk, a magnetic medium (e.g., magnetic tape), an optical medium (e.g., Compact Disc Read Only Memory (CD-ROM), Digital Versatile Disc (DVD), magneto-optical medium, such as floptical disk), a hardware device (e.g., ROM, Random Access Memory (RAM), flash memory, or the like). Examples of the program instructions may include not only machine language codes but also high-level language codes which are executable by various computing means using an interpreter. The aforementioned hardware devices may be configured to operate as one or more software modules to perform or control various embodiments of the present disclosure, and vice versa.

Modules or program modules in accordance with various embodiments of the present disclosure may include at least one or more of the aforementioned components, omit some of them, or further include other additional components. Operations performed by modules, program modules or other components in accordance with various embodiments of the present invention may be carried out sequentially, simultaneously, repeatedly, or heuristically. Furthermore, some of the operations may be performed in a different order, or omitted, or include other additional operation(s). Embodiments as described in the specification are provided for the purpose of describing and understanding of technical concept of the present disclosure. Accordingly, the scope of the present disclosure should be construed as including all the modifications or other various embodiments based on the technical idea of the present disclosure.

Figure 4:
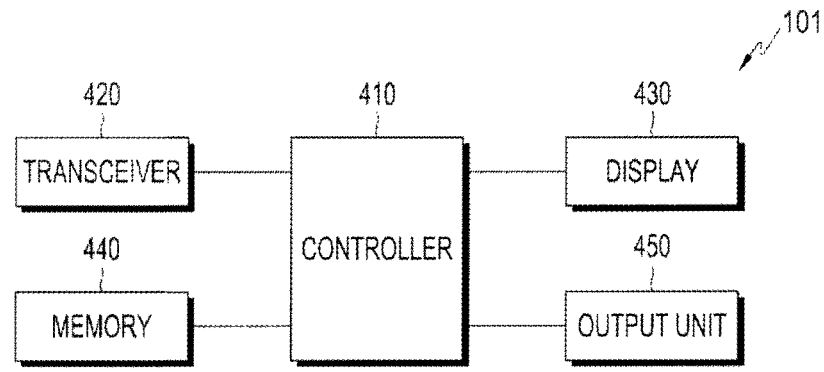
FIG. 4 is a block diagram of an electronic device for playing back image data, according to various embodiments of the present disclosure.

FIG. 4 is a block diagram of an electronic device for playing back image data, according to various embodiments of the present disclosure.

Referring to FIG. 4, the electronic device 101 for playing back image data in accordance with various embodiments of the present disclosure may include a controller 410, a transceiver 420, a display 430, a memory 440, and an output unit 450.

The controller 410, which includes hardware such as one or more processors, may perform the same functions or operations as those performed in the processor 120 of FIG. 1; the transceiver 420 includes hardware to transmit and receive communications, may perform the same functions or operations as those performed in the communication interface 170 of FIG. 1; the display 430 may perform the same functions or operations as those performed in the display 160 of FIG. 1; the non-transitory memory 440 may perform the same functions or operations as those performed in the non-transitory memory 130 of FIG. 1; and the output unit 450 may perform the same functions or operations as those performed in the I/O interface 150 of FIG. 1. Although features of playing back image data will now be described in connection with FIG. 4, it is merely by way of example, and image data may also be played back by the electronic device 101 as shown in FIG. 1. The image data may include audiovisual (A/V) data. At least one of the image data and a copy of the image data may be downloaded or streamed from an external electronic device.

The transceiver 420 may connect the electronic device 101 and external devices for communication to transmit and/or receive data. For example, the transceiver 420 may be connected to a network through wired or wireless communication to communicate with the external electronic device. The wireless communication may include at least one of Wi-Fi, Bluetooth (BT), NFC, GPS, or cellular communication (e.g., LTE, LTE-A, CDMA, WCDMA, UMTS, Wibro or GSM. The wired communication may include at least one of e.g., USB, HDMI, RS 232 or POTS.

The display 430 may display various image data (e.g., multimedia data or text data) for the user. The display 430 may display the various image data under the control of the controller 410, and may display an image with sound or video effects applied thereto. The display 430 may receive at least one touch input made by user's physical contact (e.g., by fingers including the thumb) or by a touchable input device (e.g., an electronic pen or a stylus pen). The display 430 may display at least one image captured by a camera (not shown), or may display an image stored in the memory 440 or received from the transceiver 420. The display 430 may be implemented in e.g., a resistive method, capacitive method, infrared method, or acoustic wave method.

The non-transitory memory 440 may store input/output signals or data resulting from operation of the transceiver 420, the display 430, the output unit 450 under the control of the controller 410. The non-transitory memory 440 may store control programs and applications for controlling the electronic device 101 or the controller 410. The non-transitory memory 440 may also include a non-volatile memory, a volatile memory, a Hard Disc Drive (HDD), or a Solid State Drive (SSD).

The output unit 450 may output a sound processed by the controller 410 through a speaker to the user. The output unit 450 may output the processed sound over wireless communication, e.g., Bluetooth. The output unit 450 may convert a sound to an electric signal and vice versa. At least some components of the output unit 450 may include the display 430. The output unit 450 may process sound information input or output through e.g., a speaker, a receiver, an earphone, a microphone, etc.

The controller 410 is comprised of hardware such as at least one processor or microprocessor, and may include a CPU, a ROM for storing a control program to control the electronic device 101, and a RAM for storing signals or data input from outside or for being used as a memory space for tasks performed in the electronic device 101. The CPU may include a single core, dual cores, triple cores, or quad cores. The controller 410 may control the transceiver 420, the display 430, the memory 440, and the output unit 450. The controller 410 may control the display 430 to display image data or an image obtained through the transceiver 420.

The controller 410 may obtain image data, analyze an audio signal from the obtained image data, select a mode to be applied to the image data based on the analyzed audio signal, and play back the image data by applying the selected mode to the image data. The controller 410 may control the memory to at least temporarily store A/V data, and play back the A/V data. The controller 410 may analyze an audio signal of the A/V data "on the fly" (e.g. dynamically), select one of a plurality of sound effects based on the analyzed audio signal, and play the A/V data by applying the selected sound effect to at least a part of the A/V data. The controller 410 may apply the selected sound effect to an audio signal to be reproduced. The electronic device 101 may download a copy of the A/V data from an external electronic device before storing the A/V data in the memory. Alternatively, a copy of the A/V data may be streamed to the electronic device 101 from an external electronic device before the electronic device 101 stores the A/V data in the memory. The controller 410 may buffer a part of the A/V data to be played back in some area of the memory, and analyze an audio signal of the buffered part of the A/V data.

The controller 410 may analyze or extract an audio signal from the obtained image data. The controller 410 may analyze image data received through the transceiver 420 or image data read from the memory 440, and obtain Pulse Code Modulation (PCM) data per channel by decoding the audio signal for each frame. The controller 410 may calculate center energy and deviation energy between left and right sides of each frame of the obtained PCM data per channel, and compare a value resulting from dividing the center energy by a sum of the deviation energy between the left and right sides and the center energy with a first threshold. The controller 410 may calculate the deviation energy between the left and right sides and the center energy using left and right channel buffers of each frame, and the number of samples of each frame. If the value resulting from dividing the center energy by a sum of the deviation energy between the left and right sides and the center energy is greater than the first threshold, the controller 410 may determine that the analyzed audio signal corresponds to a first audio signal e.g., an audio signal from conversation. Otherwise, if the value is not greater than the first threshold, the controller 410 may not determine that the analyzed audio signal corresponds to the first audio signal, e.g., an audio signal from conversation.

Furthermore, the controller 410 may buffer the obtained PCM data per channel for a predetermined period of time, extract a mood value from the buffered PCM data, and determine whether the analyzed audio signal is available with another mode, e.g., music or film mode by comparing the extracted mood value and obtained PCM data with a second threshold. If the combined extracted mood value and obtained PCM data is greater than the second threshold, the controller 410 may determine that the analyzed audio signal corresponds to a second audio signal, e.g., an audio signal from music. Otherwise, if the combined value is not greater than the second threshold, the controller 410 may determine that the analyzed audio signal corresponds to a third audio signal, e.g., an audio signal from a film. In the case that the analyzed audio signal corresponds to the audio signal from music, the controller 410 may use the extracted value to classify the audio signal by music genres. In the case that the analyzed audio signal corresponds to the audio signal from a film, the controller 410 may use the extracted value to classify the audio signal by film genres. The controller 410 may simultaneously perform a process of calculating the center energy and the deviation energy between left and right sides of each frame of the obtained PCM data and comparing the value resulting from dividing the calculated center energy by a sum of the deviation energy between left and right sides and the center energy with the first threshold, and a process of buffering the obtained PCM data for the predetermined period of time and extracting the mood value from the buffered PCM data.

With further reference to FIG. 4, the controller 410 may select a mode for an audio signal based on the analyzed audio signal. If the value resulting from dividing the calculated center energy by the sum of the deviation energy between left and right sides and the center energy is greater than the first threshold, the controller 410 may determine that the analyzed audio signal is the first audio signal, which may correspond to a conversation mode. The controller 410 may then select or determine a conversation mode to be applied for the image data. If the value resulting from dividing the center energy by the sum of the deviation energy between the left and right sides and the center energy is not greater than the first threshold, the controller 410 may determine that the analyzed audio signal is the second audio signal, e.g., an audio signal from music, or the third audio signal, an audio signal from a film. The controller 410 may play an image by applying the selected mode to the image data. The controller 410 may apply the selected conversation mode to the image data. Alternatively, the controller 410 may apply the selected conversation mode and a video mode that matches the selected conversation mode to the image data. The controller 410 may apply the selected music mode to the image data. Alternatively, the controller 410 may apply the selected music mode and a video mode that matches the music mode to the image data. The controller 410 may apply the selected film mode to the image data. Alternatively, the controller 410 may apply the selected film mode and a video mode that matches the film mode to the image data.

Figure 5:
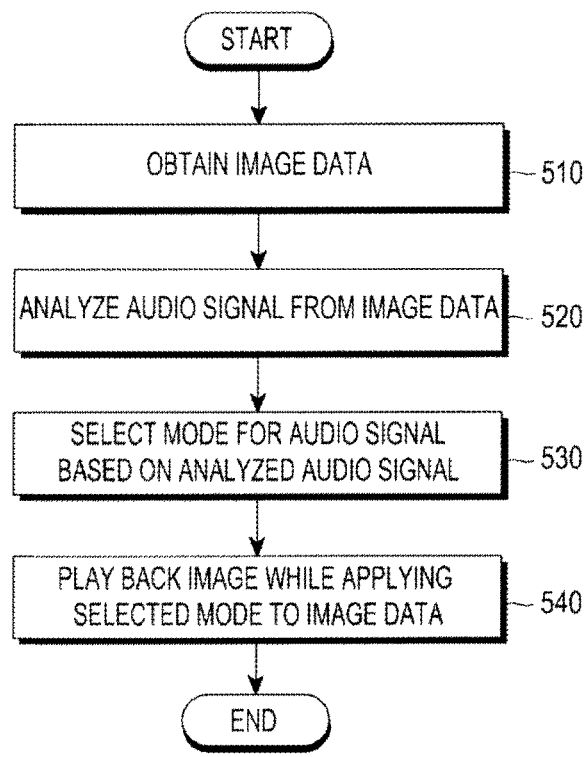
FIG. 5 is a flowchart illustrating operation of a process of playing back image data, according to an embodiment of the present disclosure.

FIG. 5 is a flowchart illustrating operation of a process of playing back image data, according to an embodiment of the present disclosure.

Referring now to FIG. 5, a process of playing back image data in accordance with an embodiment of the present disclosure will now be described in detail.

The controller 410 obtains image data, in operation 510. The controller 410 may obtain image data from at least one of the transceiver 420 and the memory 440. The image data may be received externally via the transceiver 420, or may be read from the memory 440. The transceiver 420 may include an interface to be wirelessly/wiredly connected to the external electronic device 102, 104, 106.

With continued reference to FIG. 5, at operation 520, the controller 410 may analyze an audio signal from the obtained image data. The controller 410 may analyze the image data received through the transceiver 420 or read from the memory 440, and obtain PCM data per channel by decoding the audio signal. The controller 410 may calculate center energy and deviation energy between left and right sides of each frame of the obtained PCM data, and compare a value resulting from dividing the center energy by a sum of the deviation energy between the left and right sides and the center energy with a first threshold. The controller 410 may calculate the deviation energy between the left and right sides and the center energy using left and right channel buffers of each frame, and the number of samples of each frame. If the value resulting from dividing the center energy by the sum of the deviation energy between the left and right sides and the center energy is greater than the first threshold, the controller 410 may determine that the analyzed audio signal is a first audio signal from a conversation. Otherwise, if the value is not greater than the first threshold, the controller 410 may not determine that the analyzed audio signal is the first audio signal.

Furthermore, the controller 410 may buffer the obtained PCM data per channel for a predetermined period of time, extract a mood value from the buffered PCM data, and determine whether the analyzed audio signal is a second audio signal or a third audio signal by comparing the extracted mood value with a second threshold. If the extracted mood value is greater than the second threshold, the controller 410 may determine that the analyzed audio signal is an audio signal from music. If the extracted mood value is not greater than the second threshold, the controller 410 may determine that the analyzed audio signal is an audio signal from a film. In the case where the analyzed audio signal corresponds to the audio signal from music, the controller 410 may use the extracted value to classify the audio signal by music genres. In the case that the analyzed audio signal corresponds to the audio signal from a film, the controller 410 may use the extracted value to classify the audio signal by film genres. Each mode may include a plurality of genres classified according to the mood value extracted from the analyzed audio signal. The controller 410 may simultaneously perform a process of calculating the center energy and the deviation energy between left and right sides of each frame of the obtained PCM data and comparing the value resulting from dividing the calculated center energy by a sum of the deviation energy between left and right sides and the center energy with the first threshold, and a process of buffering the obtained PCM data for the predetermined period of time and extracting the mood value from the buffered PCM data.

At operation 530, the controller 410 may select a mode for an audio signal based on the analyzed audio signal. If the value resulting from dividing the calculated center energy by the sum of the deviation energy between left and right sides and the center energy is greater than the first threshold, the controller 410 may determine that the analyzed audio signal is the first audio signal, e.g., an audio signal from conversation, and select or determine a conversation mode to be applied to the image data. Otherwise, if the value resulting from the division is not greater than the first threshold, the controller 410 may determine that the analyzed audio signal is an audio signal other than the first audio signal, e.g., an audio signal from music or from a film.

At operation 540, the controller 410 may play back an image by applying the selected mode to the image data. The controller 410 may apply the selected first audio signal (e.g., in the conversation mode) to the image data. Alternatively, the controller 410 may apply the selected first audio signal (e.g., in the conversation mode) and a video mode that matches the selected first audio signal to the image data. The controller 410 may apply the selected second audio signal (e.g., in the music mode) to the image data. Alternatively, the controller 410 may apply the selected second audio signal (e.g., in the music mode) and a video mode that matches the selected second audio signal to the image data. The controller 410 may apply the selected third audio signal (e.g., in the film mode) to the image data. Alternatively, the controller 410 may apply the selected third audio signal (e.g., in the film mode) and a video mode that matches the selected film mode to the image data. The controller 410 may play back or output an image through at least one of the display 430 and the output unit 450 by applying the mode selected based on the analyzed audio signal to the image data. The output unit 450 may include the speaker 282, the earphone 286, wireless communication speaker or earphone (not shown).

Figure 6:
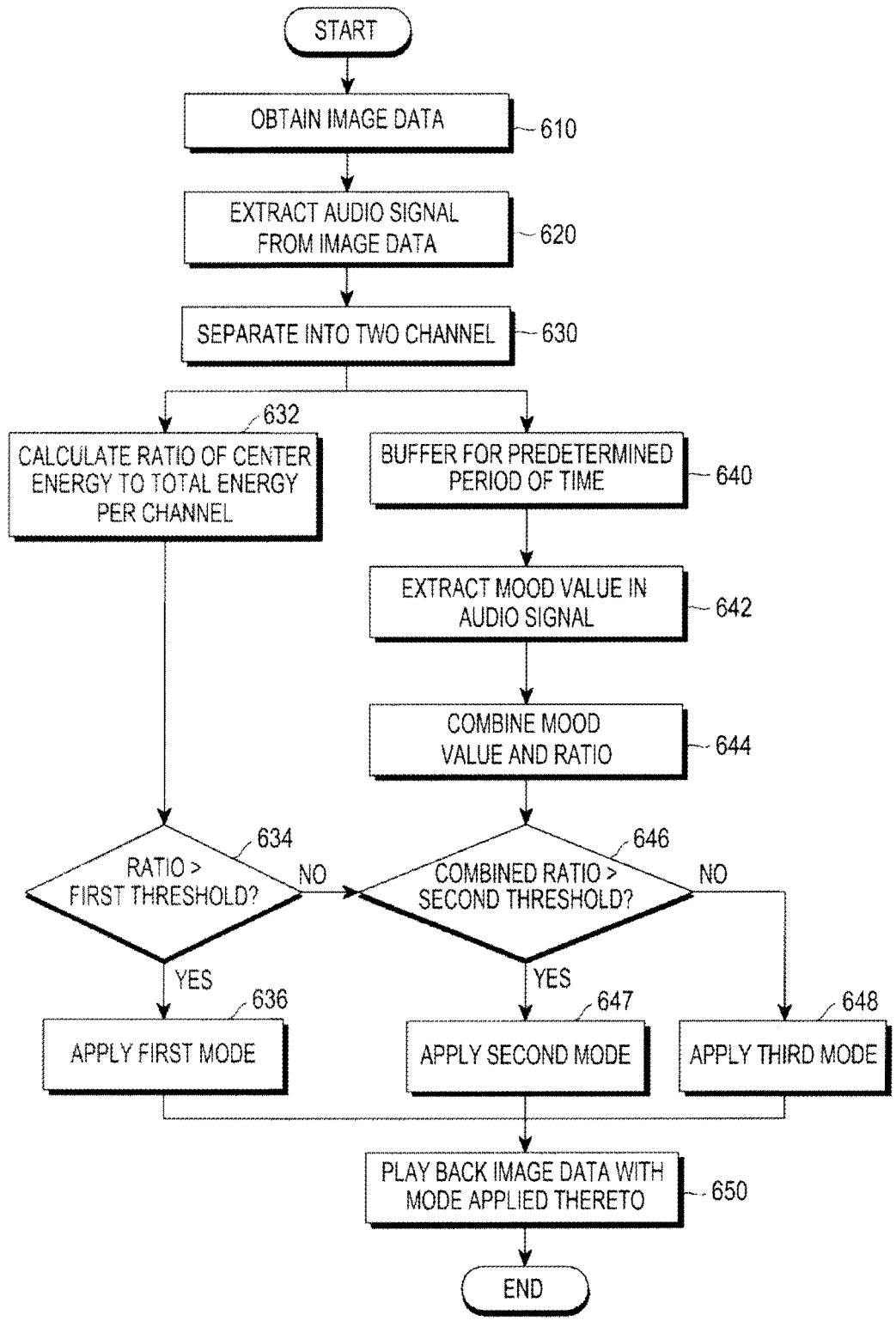
FIG. 6 is a flowchart illustrating operation of a process of playing back image data with effects applied thereto, according to an embodiment of the present disclosure.

FIG. 6 is a flowchart illustrating operation of a process of playing back image data with effects applied thereto, according to an embodiment of the present disclosure.

Referring now to FIG. 6, a process of playing back image data with effects applied thereto in accordance with an embodiment of the present disclosure will now be described in detail.

At operation 610, the controller 410 obtains image data. The controller 410 may obtain image data from at least one of the transceiver 420 and the non-transitory memory 440. The image data may be received from the outside through the transceiver 420, or may read from the memory 440. The transceiver 420 may include an interface to be wirelessly/wiredly connected to the external electronic device 102, 104, 106.

In operation 620, the controller 410 may extract an audio signal from the obtained image data and at operation 630, separate them into two channels. The controller 410 may analyze the image data received through the transceiver 420 or read from the memory 440. The controller 410 may determine a type of the image data by analyzing a flag for the image data. For example, if the flag is zero, it corresponds to an audio signal; and if the flag is one, it corresponds to a video signal. The controller 410 may then obtain PCM data by decoding the analyzed audio data per channel. The decoded signal per channel may be converted into two channels, e.g., from six channels or from two channels.

With continued reference to FIG. 6, at operation 632, the controller 410 may calculate a ratio of center energy to total energy for each channel. The controller 110 may separate the obtained PCM data into two channels, e.g., left and right channels, and calculate the ratio of center energy to total energy of each frame per channel in real time.

The controller 410 may calculate the total energy for each frame of the obtained PCM data in real time using the following equation 1:

$$A = \text{Log}\left[\sum_{0}^{N-1}\left(\frac{(\text{Left channel buffer} - \text{Right channel buffer})^2}{\text{normlaize factor}}\right)/N\right] \quad (1)$$

where Left channel buffer refers to a size of a left buffer of the PCM data, Right channel buffer refers to a size of a right buffer of the PCM data, normalize factor refers to a constant value added to reduce an amount of calculation, and N refers to the number of samples of a frame. For example, to obtain the total energy, the square of a value resulting from subtracting the Right channel buffer from the Left channel buffer with respect to the PCM data may first be divided by the normalize factor. This process may be computed as many times as a total number of the samples of a current frame, the results of the process may be combined, and the sum of the results may be divided by the total number of the samples of the current frame, thereby obtaining the total energy.

The controller 410 may calculate the center energy for each frame of the obtained PCM data in real time using the following equation 2:

$$C = \text{Log}\left[\sum_{0}^{N-1}\left(\frac{((\text{Left channel buffer} + \text{Right channel buffer})/2)^2}{\text{normlaize factor}}\right)/N\right] \quad (2)$$

where the Left channel buffer refers to a size of a left buffer of the PCM data, the Right channel buffer refers to a size of a right buffer of the PCM data, normalize factor refers to a constant value added to reduce an amount of calculation, and N refers to the number of samples of a frame. For example, to obtain the center energy, the square of a value resulting from dividing an addition of the Right channel buffer to the Left channel buffer with respect to the PCM data by two, may first be divided by the normalize factor. This process may be computed as many times as a total number of the samples of a current frame, the results of the process may be combined, and the sum of the results may be divided by the total number of the samples of the current frame, thereby obtaining the center energy.

The controller 410 may then calculate a ratio using the calculated total energy and center energy as in the following equation (3):

$$\text{Result} = \frac{C}{A+C} \quad (3)$$

In equation (3), a ratio of the center energy to the total energy may be obtained by dividing the center energy calculated by equation (2) by a sum of the deviation energy between left and right sides calculated by equation (1) and the center energy of equation (2).

At operation 634, the controller 410 may then compare the ratio calculated from equations 1 to 3 with a first threshold, and if the ratio is greater than the first threshold, the controller 410 may determine that the extracted audio signal is the first audio signal, e.g., an audio signal from conversation. At operation 636, the controller applies the first mode to the extracted audio signal. The controller 410 may calculate center energy and deviation energy between left and right sides of each frame of the obtained PCM data, and compare a value resulting from dividing the center energy by a sum of the deviation energy between the left and right sides and the center energy with the first threshold. The controller 410 may calculate the deviation energy between the left and right sides and the center energy using left and right channel buffers of each frame, and the number of samples of each frame. If the value resulting from dividing the center energy by a sum of the deviation energy between the left and right sides and the center energy is greater than the first threshold, the controller 410 may determine that the analyzed audio signal corresponds to a first audio signal e.g., an audio signal from conversation. Otherwise, if the value is not greater than the first threshold, the controller 410 may not determine that the analyzed audio signal corresponds to the first audio signal, e.g., an audio signal from conversation. If the value is not greater than the first threshold, the controller 410 may compare a combination of a mood value to be extracted in operation 642 and the ratio with a second threshold. The first threshold may be a resultant value after a tendency is figured out. The first threshold may range from 1 to 100. The first threshold may be 57 in an embodiment, but may be any other value less or greater than 57 in other embodiments. The controller 410 may calculate a ratio of center energy to total energy for each channel, and determine whether the audio signal corresponds to the first audio signal, e.g., an audio signal from conversation by comparing the ratio with the first threshold. The controller 410 may then apply a corresponding mode according to the characteristics of the audio signal, in operation 636.

At operation 640, the controller 410 may buffer the PCM data obtained in operation 620 for a predetermined period of time for each channel, in operation 640, and at operation 642 extract a mood value in the audio signal. The controller 410 may control buffering of the PCM data obtained for the predetermined period of time to analyze the mood.

For example, the predetermined period of time may be 3 seconds, but it may have any other value less or greater than 3 seconds. For example, the predetermined period of time may be 4 seconds, or 5 seconds, or for example 10 seconds, or may be less than 3 seconds (2 seconds, 1.5 second, 1 second 0.5 seconds, 0.25 second, etc.) The controller 410 may secure a processing time for applying an effect to the image data while buffering the obtained PCM data for the predetermined period of time. Since a predetermined number of samples, e.g., at least 2048 samples need to be input to extract a mood value, a buffering scheme may include buffering the predetermined number of samples in a buffer (not shown), deleting the foremost data from the buffer for each frame in a circulation manner after the buffer is full, and storing PCM data of a current frame in the last space of the buffer. While the predetermined number of samples is said to be at least 2048 in the embodiment of the present disclosure, more than or less than 2048 samples may be applied in some other embodiments.

The method for playing back image data with an effect applied thereto may include, for example, the following three non-limiting methods: a first method including storing PCM data in a buffer in advance for a predetermined period of time, e.g., 3 seconds before the image data is played back, and proceeding mood analysis by starting a mood engine at the same time with playing back of the image data to be applied in distinguishing the result; a second method including inputting PCM data for a predetermined period of time, e.g., 3 seconds after playing back of the image data to the mood engine to start analysis; and a third method including filling the buffer in a circulating manner (e.g. ring buffering) in the unit of frame to extract the analyzed result in the unit of frame, after the buffer is full. As discussed above, the controller 410 may control the buffering of the PCM data for the predetermined period of time and extract a mood value from the buffered PCM data through the mood engine.

At operation 644, the controller 410 may combine the extracted mood value and the calculated ratio, and at operation 646, compare the combined ratio with the second threshold. The controller 410 may extract the mood value from the frame (in the unit of frame). The controller 410 may extract the mood value from the frame in real time. The controller 410 may use the extracted mood value to determine an additional audio signal mode of the image data. If the combined ratio (or value) is greater than the second threshold, the controller 410 may determine that the analyzed audio signal is a second audio signal, e.g., an audio signal from music. In the case that the analyzed audio signal corresponds to the audio signal from music, the controller 410 may classify the audio signal by music genres based on the extracted value. If the combined ratio (or value) is not greater than the second threshold, the controller 410 may determine that the analyzed audio signal is a third audio signal, e.g., an audio signal from a film. In the case that the analyzed audio signal corresponds to the audio signal from a film, the controller 410 may classify the audio signal by film genres based on the extracted value.

The controller 410 may extract a distinguishable particular value from each frame, (e.g., at least one of Exciting, Violent, Cheerful values). The controller 410 may use first, second, and third particular values, (e.g., Exciting, Violent, Cheerful values) from among the mood values extracted through the mood engine for each frame to distinguish the audio signal. If a value resulting from subtracting the second particular value, (e.g., Violent value) from the first particular value, (e.g., Exciting value), which is greater than the second threshold lasts for more than 100 frames, the controller 410 may determine that the audio signal corresponds to the second audio signal, e.g., an audio signal from music. Alternatively, if a value resulting from subtracting the second particular value, e.g., (Violent value) from the first particular value, (e.g., Exciting value is not greater than the second threshold), or does not last for more than 100 frames, the controller 410 may determine that the audio signal corresponds to the second audio signal, e.g., an audio signal from music. The second threshold may be 4 in an embodiment, but may be any other value less or greater than 4 in other embodiments. The controller 410 may extract the first, second, and third particular values, (e.g., Exciting, Violent, Cheerful values), and use the extracted values to expand categories of audio mode. If the audio signal corresponds to an audio signal from music, the controller 410 may use the extracted first, second, and third particular values, (e.g., Exciting, Violent, Cheerful values) to classify the music into some genres. The genres may include rock, pop, classical genres. In the present disclosure, the first, second, and third particular values (e.g., Exciting, Violent, Cheerful values) may be used to classify the music into other various genres than the rock, pop, classical genres. The controller 410 may also use the extracted first, second, and third particular values, (e.g., Exciting, Violent, Cheerful values) to classify the film into some genres. The genres may include action, war, drama, comic genres. In the present disclosure, the first, second, and third particular values (e.g., Exciting, Violent, Cheerful values) may be used to distinguish other various genres than action, war, drama, comic genres. The controller 410 may use an amount of change in a particular value to distinguish an action level. The controller 410 may combine the extracted mood value and the calculated ratio, and compare the combined ratio with the second threshold to select an additional audio mode.

At operations 647, 648, the controller 410 may then apply the corresponding mode according to the characteristics of the determined audio signal.

In order to apply an effect to the audio signal in real time based on the comparison results in operations 634, 646, the controller 410 may set a hangover and estimation interval to naturally apply the effect. To prevent sound fluctuation due to arbitrary changes of effects because analysis is performed for each frame, the controller 410 may maintain an effect for a certain interval, e.g., about 100 frames through hangover. Estimation is applied when the effect lasts for more than a predetermined number of frames. In the case that the audio signal corresponds to a signal from a film, if a value satisfying a condition lasts for more than a predetermined number of frames, (e.g., 30 frames), the controller 410 may apply a film effect to the audio signal. In the case that the audio signal corresponds to a signal from a conversation, if a value satisfying a condition lasts for more than a predetermined number of frames, (e.g., 40 frames), the controller 410 may apply a conversation effect to the audio signal. In the case that the audio signal corresponds to a signal from music, if a value satisfying a condition lasts for more than a predetermined number of frames, e.g., 100 frames, the controller 410 may apply a music effect to the audio signal. When the audio signal corresponds to a signal from a conversation, the controller 410 may improve clarity of the audio signal. When the audio signal corresponds to a signal from music, the controller 410 may apply a clarity effect 100% if the ratio of the center energy to the total energy is 100, and may apply the clarity effect 90% if the ratio of the center energy to the total energy is 90, for example. The value of the clarity effect may vary in real time. If the audio signal corresponds to a signal from music or a signal from a film, the controller 410 may apply an effect by adjusting the Surround value and the Bass value in real time. The controller 410 may differently apply an effect by decreasing a deviation of sound volume if scenes of the image data change, and may differently apply the effect by comparing levels of the previous sound volume and current sound volume and adjusting the current sound volume to be similar to the previous sound volume if the sound volume of the image data grows abruptly.

At operation 650, the controller 410 may play back the image data with a mode applied thereto, in operation 650. The controller 410 may apply a mode determined based on the audio signal and a video mode that matches the mode to the image data. If the determined mode is a conversation mode, the controller 410 may apply the conversation mode and a video mode that matches the conversation mode to the image data. If the determined mode is a music mode, the controller 410 may apply the music mode and a video mode that matches the music mode to the image data. If the determined mode is a film mode, the controller 110 may apply the film mode and a video mode that matches the film mode to the image data.

Figure 7:
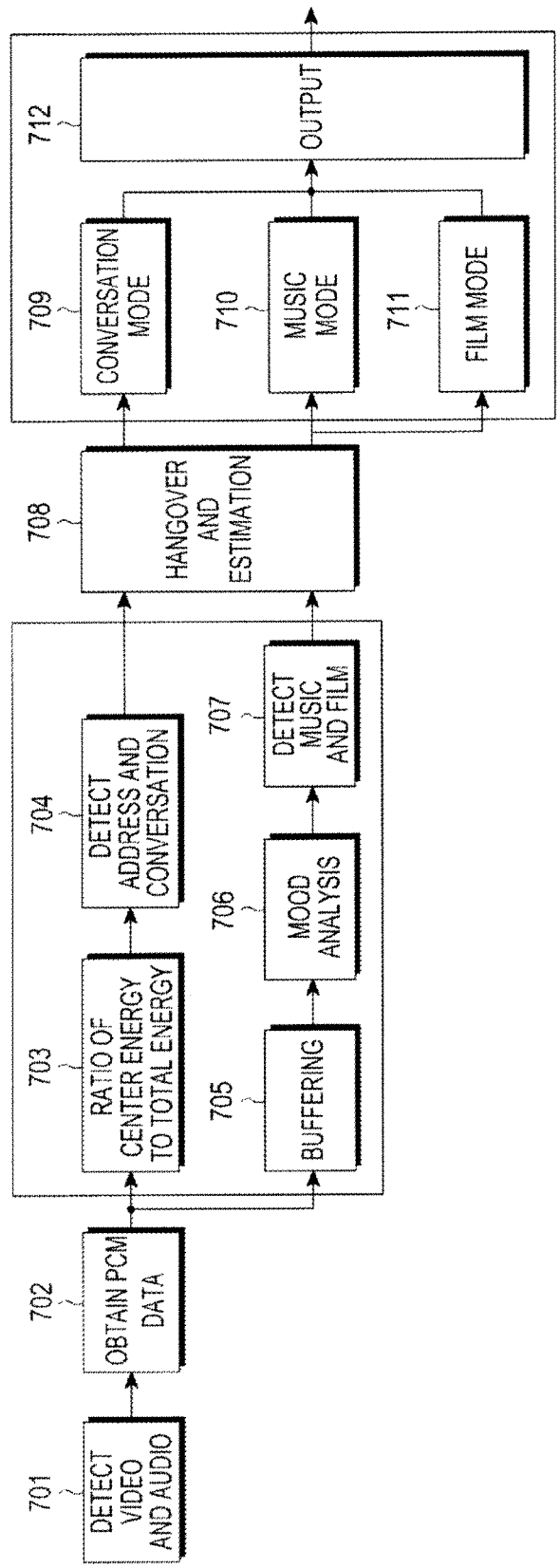
FIG. 7 is an operative diagram of applying effects to image data in an electronic device, according to an embodiment of the present disclosure.

FIG. 7 is a block diagram of applying effects to image data in an electronic device, according to an embodiment of the present disclosure.

Referring now to FIG. 7, at block 701, the electronic device 101 may detect a video signal and an audio signal from the obtained image data to apply an effect to the image data.

The electronic device 101 may determine a type of the image data by analyzing a flag for the image data. For example, if the flag is zero, it corresponds to an audio signal; and if the flag is one, it corresponds to a video signal. The electronic device 101 may obtain image data and detect an audio signal from the obtained image data.

At block 702, the electronic device 101 may obtain PCM data per channel from the detected audio stream. The obtained PCM data per channel may be incorporated or separated into two channels, e.g., from 6 channels to 2 channels or from 2 channels to 2 channels. The electronic device 101 may obtain PCM data per channel by decoding the audio signal. The obtained PCM data per channel may be delivered both to blocks 703 and 705.

At block 703, the electronic device 101 may calculate a ratio of center energy to total energy for each frame of the obtained PCM data per channel. The electronic device 101 may calculate a ratio of center energy to total energy in real time for each frame of two channels, (e.g., left and right channels, first and second channels) of the obtained PCM data per channel, and deliver the calculation result to block 704. The ratio of center energy to total energy may be obtained by dividing the center energy by a sum of deviation energy between the left and right sides and the center energy.

At block 704, the electronic device 101 may determine whether the audio signal is from an address or a conversation, based on the calculated ratio. The electronic device 101 may compare the calculated ratio with a first threshold, and determine that the extracted audio signal corresponds to an audio signal from a conversation if the calculated ratio is greater than the first threshold. Otherwise, if the calculated ratio is not greater than the first threshold, the electronic device 101 may not determine that the analyzed audio signal corresponds to an audio signal from a conversation.

At block 705, the electronic device 101 may buffer the obtained PCM data. The electronic device 101 may buffer PCM data obtained from block 702. The buffering may be performed while a ratio of center energy to total energy is calculated and the audio signal is determined to correspond to an audio signal from a conversation based on the ratio. The electronic device 101 may extract a mood value through the buffered PCM data, in block 706.

The electronic device 101 may buffer the obtained PCM data for a predetermined period of time, and extract a mood value in the audio signal. The electronic device 101 may control buffering of the PCM data obtained for the predetermined period of time to analyze the mood. For example, the predetermined period of time may be 3 seconds, but it may have any other value less or greater than 3 seconds.

The electronic device 101 may use the ratio calculated in block 703 and the extracted mood value to determine whether the audio signal corresponds to a signal from music or a signal from a film, in block 707.

The electronic device 101 may combine the extracted or analyzed mood value and the calculated ratio, and compare the combined ratio with a second threshold. The electronic device 101 may extract the mood value in the unit of frame. The electronic device 101 may extract the mood value in the unit of frame in real time. The electronic device 101 may use the extracted mood value to determine whether the image data corresponds to a film scene or a music scene. The ratio of center energy to total energy may be received from block 704. If the combined ratio (or value) is greater than the second threshold, the electronic device 101 may determine that the analyzed audio signal corresponds to an audio signal from music. In the case that the analyzed audio signal corresponds to the audio signal from music, the electronic device 101 may use the extracted value to classify the audio signal by music genres. If the combined ratio (or value) is not greater than the second threshold, the electronic device 101 may determine that the analyzed audio signal is an audio signal from a film. In the case that the analyzed audio signal corresponds to the audio signal from a film, the electronic device 101 may use the extracted value to classify the audio signal by film genres. If the audio signal is determined to correspond to a signal from an address or conversation, the electronic device 101 may naturally apply an effect in block 708 by setting a hangover and estimation interval to apply the effect to the audio signal in real time. To prevent sound fluctuation due to arbitrary changes of effects because analysis is performed for each frame, the electronic device 101 may maintain an effect for a certain interval, e.g., about 100 frames through hangover.

In the case that the audio signal corresponds to a signal from a conversation, if a value satisfying a condition lasts for more than a predetermined number of frames, (e.g., 40 frames), the electronic device 101 may apply a conversation effect to the audio signal, in block 709. In applying the conversation effect to the audio signal, the electronic device 101 may also apply a video effect that matches the conversation effect (or conversation mode) to the audio signal together with the conversation effect. The conversation effect may further emphasize conversations in a lecture or discussion to lead the user to be able to pay attention to the conversation. In an embodiment, the conversation effect may be an effect of emphasizing delivery of voice from the image data (e.g., a lecture) and making the user's eyes feel comfortable by enhancing the green color or increasing sharpness. In the case that the audio signal corresponds to a signal from music, if a value satisfying a condition lasts for more than a predetermined number of frames, (e.g., 100 frames), the electronic device 101 may apply a music effect to the audio signal, in block 710. In applying the music effect to the audio signal, the electronic device 101 may also apply a video effect that matches the music effect (or music mode) to the audio signal together with the music effect. The music effect may further emphasize music in, for example, a music video or a music show to lead the user to be able to pay attention to the music. In an embodiment, the music effect may provide a turnaround effect or a tough effect for rock music, improve sharpness for classical music, and provide a soft effect for ballad music to feel comfortable. In the case that the audio signal corresponds to a signal from a film, if a value satisfying a condition lasts for more than a predetermined number of frames, (e.g., 30 frames), the electronic device 101 may apply a film effect to the audio signal, in block 711. In applying the film effect to the audio signal, the electronic device 101 may also apply a video effect that matches the film effect to the audio signal together with the film effect. The film effect may provide a screen flickering effect, a touch effect, or a frame discontinuity effect depending on the scene to lead the user to pay more attention to the film.

When the audio signal corresponds to a signal from a conversation, the electronic device 101 may improve clarity of the audio signal in block 708. When the audio signal corresponds to a signal from a conversation, the electronic device 101 may apply a clarity effect 100% to the audio signal if the ratio of the center energy to the total energy is 100, and may apply the clarity effect 90% to the audio signal if the ratio of the center energy to the total energy is 90, in block 708. The value of the clarity effect may vary in real time. If the audio signal corresponds to a signal from music or a signal from a film, the electronic device 101 may apply an effect by adjusting the Surround value and the Bass value in real time. The electronic device 101 may differently apply an effect by decreasing a deviation of sound volume if scenes of the image data change, and may differently apply the effect by comparing levels of the previous sound volume and current sound volume and adjusting the current sound volume to be similar to the previous sound volume if the sound volume of the image data grows abruptly.

The electronic device 101 may apply at least one of the conversation mode, music mode, and film mode to the audio signal, and then at block 712, output the audio signal with the at least one mode applied thereto. The electronic device 101 may apply a mode determined based on the audio signal and a video mode that matches the mode to the image data, and at block 712, output the result. If the determined mode is a conversation mode, the electronic device 101 may apply the conversation mode and a video mode that matches the conversation mode to the image data and at block 712, output the result. If the determined mode is a music mode, the electronic device 101 may apply the music mode and a video mode that matches the music mode to the image data and at block 712, output the result. If the determined mode is a film mode, the electronic device 101 may apply the film mode and a video mode that matches the film mode to the image data and at block 712, output the result. The respective blocks of FIG. 7 may be performed by the controller 410 of the electronic device 101, or by a separate device equipped in the electronic device 101.

Figure 8:
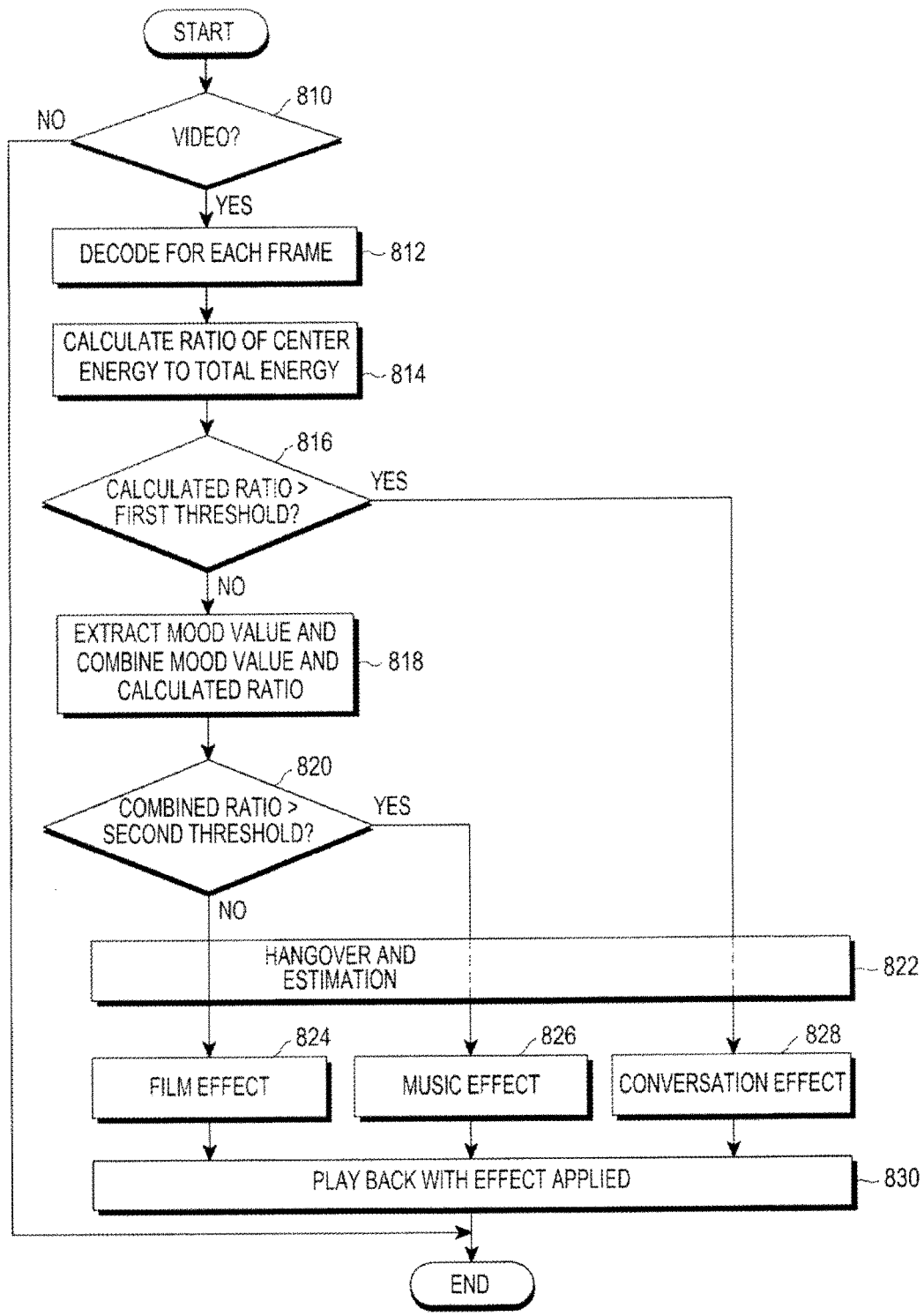
FIG. 8 is a flowchart illustrating operation of a process of playing back image data with effects applied thereto, according to another embodiment of the present disclosure.

FIG. 8 is a flowchart illustrating operation of a process of playing back image data with effects applied thereto, according to another embodiment of the present disclosure.

Referring now to FIG. 8, a process of playing back image data with effects applied thereto in accordance with another embodiment of the present disclosure will now be described in detail.

At operation 812, if a video exists in image data in operation 810, the electronic device 101 may decode an audio signal from the video in the unit of frame. The electronic device 101 may receive and obtain data from the outside through the transceiver 420, or may retrieve and obtain data from the memory 440. The electronic device 101 may analyze audio signals from the obtained image data, and obtain PCM data per channel by decoding the analyzed audio signal in the unit of frame. The obtained PCM data per channel may be incorporated or separated into two channels, e.g., from 6 channels to 2 channels or from 2 channels to 2 channels.

At operation 814, the electronic device 101 may calculate a ratio of center energy to total energy for each frame of the PCM data. The electronic device 101 may calculate a ratio of center energy to total energy in real time for each frame of two channels, e.g., left and right channels of the obtained PCM data. The electronic device 101 may calculate the deviation energy between the left and right sides and the center energy using left and right channel buffers of each frame, and the number of samples of each frame. The electronic device 101 may calculate a ratio of center energy to total energy by dividing the center energy by a sum of the total energy and the center energy.

At operation 816, if the calculated ratio is greater than a first threshold, at operation 822 the electronic device 101 may perform hangover and estimation and at operation 878 determine whether to apply a conversation effect to the audio signal. The electronic device 101 may compare the ratio calculated in operation 814 and the first threshold. In the case that the audio signal corresponds to a signal from a conversation, if a value satisfying a condition lasts for more than a predetermined number of frames, (e.g., 40 frames), the controller 410 may apply the conversation effect to the audio signal. The first threshold may be a resultant value after a tendency is figured out. The first threshold may range from 1 to 100. The first threshold may be 57 in an embodiment, but may be any other value less or greater than 57 in other embodiments. If the calculated ratio is greater than the first threshold, the electronic device 101 may determine that the audio signal corresponds to an audio signal from conversation and may perform hangover and estimation on the audio signal. The electronic device 101 may naturally apply an effect by setting a hangover and estimation interval to apply the effect to the audio signal in real time. To prevent sound fluctuation due to arbitrary changes of effects because analysis is performed for each frame, the electronic device 101 may maintain an effect for a certain interval, e.g., about 100 frames through hangover.

If the ratio calculated in operation 816 is not greater than the first threshold, then at operation 818 the electronic device 101 may extract a mood value in the audio signal and combine the extracted mood value and the calculated ratio. If the ratio calculated in operation 816 is not greater than the first threshold, the electronic device 101 may buffer PCM data obtained for each channel for a predetermined period of time, extract a mood value in the audio signal, and combine the extracted mood value and the calculated ratio. The electronic device 101 may control buffering of the PCM data obtained for each channel for the predetermined period of time for mood analysis. The electronic device 101 may extract the mood value in the unit of frame. The electronic device 101 may extract the mood value in the unit of frame in real time.

If the combined ratio is greater than a second threshold, then at operation 822 the electronic device 101 may perform hangover and estimation and at operation 826 determine whether to apply a music effect to the audio signal. The electronic device 101 may compare the ratio combined in operation 818 with the second threshold, and may determine to apply the music effect to the audio signal if the combined ratio is greater than the second threshold. In the case that the audio signal corresponds to a signal from music, if a value satisfying a condition lasts for more than a predetermined number of frames, (e.g., 100 frames), the electronic device 101 may apply the music effect to the audio signal. The second threshold, for example, may be 4 in an embodiment, but may be any other value less than 4 (e.g. 3, 2, 1, 1.5 0.5, 0.25, etc.) or greater than 4 (e.g. 4.5, 5, 6, 10, etc.) in other embodiments.

If the ratio calculated in operation 820 is not greater than the second threshold, then at operation 822 the electronic device 101 may perform hangover and estimation and at operation 824 determine whether to apply a film effect to the audio signal.

At operation 818, the electronic device 101 may compare the ratio combined with the second threshold, and may determine to apply the film effect to the audio signal if the combined ratio is not greater than the second threshold. In the case that the audio signal corresponds to a signal from a film, if a value satisfying a condition lasts for more than a predetermined number of frames, (e.g., 30 frames), the electronic device 101 may apply a film effect to the audio signal.

At operation 830, the electronic device 101 may play back or output a result of applying the effect determined in the operations 824, 826, 828 to the data. The electronic device 101 may apply a mode determined based on the audio signal and a video mode that matches the mode to the image data, and play back (or output) the result. If the determined mode is a conversation mode, the electronic device 101 may apply the conversation mode and a video mode that matches the conversation mode to the image data, and play back (or output) the result. If the determined mode is a music mode, the electronic device 101 may apply the music mode and a video mode that matches the music mode to the image data. If the determined mode is a film mode, the electronic device 101 may apply the film mode and a video mode that matches the film mode to the image data, and play back (or output) the result.

Figure 9A:
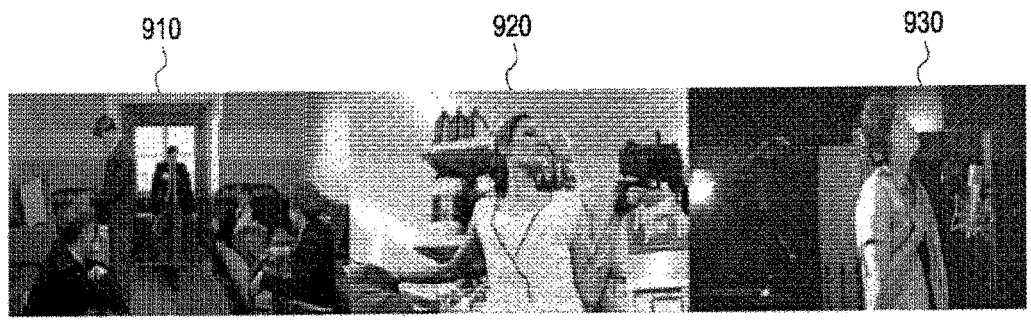
FIG. 9A shows image data without effects applied thereto, according to an embodiment of the present disclosure.
Figure 9B:
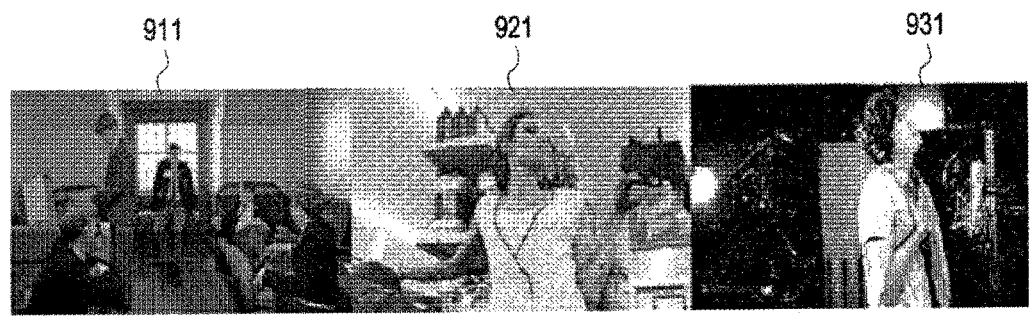
FIG. 9B shows image data with effects applied thereto, according to an embodiment of the present disclosure.
Figure 9C:
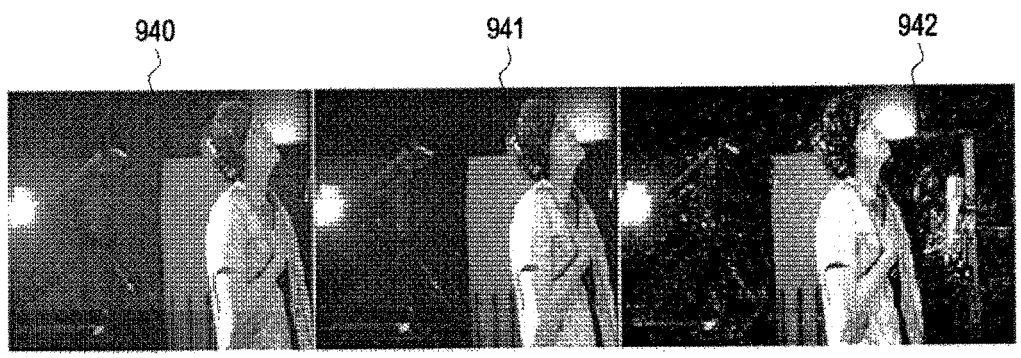
FIG. 9C shows a process of applying an effect to image data, according to an embodiment of the present disclosure.

FIG. 9A shows image data without effects applied thereto, according to an embodiment of the present disclosure, FIG. 9B shows image data with effects applied thereto, according to an embodiment of the present disclosure, and FIG. 9C shows a process of applying an effect to image data, according to an embodiment of the present disclosure.

Referring now to FIG. 9A, a first image 910 is an image without a conversation mode applied to the image data, a second image 920 is an image without a film mode applied to the image data, and a third image 930 is an image without a music mode applied to the image data. Once the images are applied with respective effects, first, second, and third images 911, 921, and 931 shown in FIG. 9B may be obtained. Specifically, when the first image 910 of FIG. 9A is applied with the conversation mode, the first image 911 of FIG. 9B may be played back; when the second image 920 of FIG. 9A is applied with the film mode, the second image 921 of FIG. 9B may be played back; and when the third image 930 of FIG. 9A is applied with the music mode, the third image 931 of FIG. 9B may be played back. Since the first image 911 of FIG. 9B has an effect applied to acoustic components as compared to the first image 910 of FIG. 9A, the user may not recognize any visual difference between the two images 910 and 911. A fluctuation effect may be applied to the second image 921 of FIG. 9B to provide a feeling of urgency as compared with the second image 920 of FIG. 9A. A pen-touch effect may be applied to the third image 931 of FIG. 9B to provide a musical feeling as compared with the third image 930 of FIG. 9A. In applying the effects to the image data, a small change may also be made to enable the user to feel the effects. Such effects may be selected by the user or controlled and provided by the manufacturer. The mode may be applied in the unit of frame or cut. When there is a change to such an image, gradual screen changes, such as gradation may be made in order for the user not to feel alienation.

Referring now to FIG. 9C, first, second, and third images 940, 941, and 942 are images in the process of applying the corresponding effect from the third image 930 of FIG. 9A to the third image 931 of FIG. 9B. In FIG. 9C, the first image 940 is an image without the effect applied thereto, the second image 941 is an image with the effect applied 50%, and the third image 942 is an image with the effect applied 100%. As shown in FIG. 9C, with the effect applied to the image, it may be seen that a visual effect is provided for the third image 942. The mode may be applied in the unit of frame or cut. When there is a change to such an image, gradual screen changes, such as gradation may be made in order for the user not to feel alienation.

In various embodiments of the present disclosure, a computer-readable storage medium may be provided. The computer-readable storage medium may have instructions embodied thereon, when executed by at least a processor, to cause the processor to perform or control at least one of the aforementioned operations. The instructions may include a first instruction set to obtain image data, a second instruction set to analyze an audio signal from the obtained image data, a third instruction set to use the analyzed audio signal to select a mode to be applied to the image data, and a fourth instruction set to apply the selected mode to the image data for playback.

According to various embodiments of the present disclosure, different effects may be applied to image data depending on types of audio signals of the image data, thereby providing a conveniently enjoyable image for the user.

Furthermore, an appropriate effect may be automatically applied to a scene in real time whenever there is a change in image data, and thus, the image data may be played back more quickly than in a case that the user manually designates an appropriate effect for an image to be played back.

The apparatuses and methods of the disclosure can be implemented in hardware, and in part as firmware or via the execution of software or computer code in conjunction with hardware that is stored on a non-transitory machine readable medium such as a CD ROM, a RAM, a floppy disk, a hard disk, or a magneto-optical disk, or computer code downloaded over a network originally stored on a remote recording medium or a non-transitory machine readable medium and stored on a local non-transitory recording medium for execution by hardware such as a processor, so that the methods described herein are loaded into hardware such as a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc., that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. In addition, an artisan understands and appreciates that a "processor", "microprocessor" "controller", or "control unit" constitute hardware in the claimed disclosure that contain circuitry that is configured for operation. Under the broadest reasonable interpretation, the appended claims constitute statutory subject matter in compliance with 35 U.S.C. §101 and none of the elements are software per se. No claim element herein is to be construed under the provisions of 35 U.S.C. 112, sixth paragraph, unless the element is expressly recited using the phrase "means for".

The definition of the terms "unit" or "module" as referred to herein are to be understood as constituting hardware circuitry such as a CCD, CMOS, SoC, AISC, FPGA, at least one processor or microprocessor (a controller or control unit) configured for a certain desired functionality, or a communication module containing hardware such as transmitter, receiver or transceiver, or a non-transitory medium comprising machine executable code that is loaded into and executed by hardware for operation, in accordance with statutory subject matter under 35 U.S.C. §101 and do not constitute software per se.

While the disclosure has been shown and described with reference to certain exemplary embodiments thereof, it will be understood by those skilled in the art that various changes in form and details may be made therein without departing from the spirit and scope of the disclosure as defined by the appended claims and their equivalents.

What is claimed is:

1. A method for operating an electronic device, the method comprising:
    storing audiovisual (A/V) data for a predetermined period of time, in a memory of the electronic device; and
    playing back the A/V data stored in the memory;
    wherein playing back the A/V data comprises:
    analyzing an audio signal of the A/V data dynamically;
    selecting one of a plurality of sound effects based on the analyzed audio signal; and
    playing back the A/V data by applying the selected one sound effect to at least a part of the A/V signal,
    wherein selecting one of the plurality of sound effects comprising:
    obtaining Pulse Code Modulation (PCM) data per channel by decoding the analyzed audio signal;
    calculating a deviation energy between left and right sides of each frame of the obtained PCM data per channel, and center energy; and
    selecting one of the plurality of sound effects based on the calculated deviation energy and the center energy.

2. The method of claim 1, further comprising:
    downloading a copy of the A/V data from an external electronic device prior to storing the A/V data in the memory.

3. The method of claim 1, further comprising:
    receiving a stream of a copy of the A/V data from an external electronic device prior to storing the A/V data in the memory.

4. The method of claim 1, wherein analyzing the audio signal of the A/V data dynamically comprises,
    buffering a part of the A/V data to be played back in an area of the memory; and
    analyzing an audio signal of the buffered part of the A/V data.

5. The method of claim 1, wherein playing back the A/V data by applying the selected one sound effect to at least a part of the A/V signal comprises:
    applying the selected one sound effect to an audio signal to be played back.

6. The method of claim 1, further comprising:
    comparing a value resulting from dividing the center energy by a sum of the deviation energy and the center energy with a first threshold.

7. The method of claim 6, further comprising:
    determining the analyzed audio signal as a first audio signal; and
    selecting a conversation mode to be applied to image data of the A/V data, if the value of the division is greater than the first threshold.

8. The method of claim 7, wherein a selected mode corresponds to one of a conversation mode, a music mode, and a film mode, each mode including a plurality of genres classified according to a mood value extracted from the analyzed audio signal.

9. The method of claim 1, further comprising:
    buffering the obtained PCM data per channel for a predetermined period of time;
    extracting a mood value from the buffered PCM data per channel;
    combining the extracted mood value, and a ratio of center energy to total energy calculated with the obtained PCM data per channel in frame; and
    determining whether the analyzed audio signal comprises at least one of other audio signals by comparing the combined value with a second threshold.

10. The method of claim 9, further comprising:
    if the analyzed audio signal corresponds to an audio signal from music, using the extracted mood value to classify the audio signal by music genres.

11. The method of claim 9, further comprising:
    if the analyzed audio signal corresponds to an audio signal from a film, using the extracted mood value to classify the audio signal by film genres.

12. An electronic device for playing back image data, the electronic device comprising:
    a transceiver configured to transmit/receive image data;
    a non-transitory memory configured to store the image data;
    a controller configured to include at least one processor having circuitry configured to analyze an audio signal from the image data, select a mode to be applied to the image data based on the analyzed audio signal, and apply the selected mode to the image data; and
    an output configured to play back the image data with the selected mode applied thereto,
    wherein the controller is further configured to:
    obtain Pulse Code Modulation (PCM) data per channel by decoding the analyzed audio signal;
    calculate a deviation energy between left and right sides of each frame of the obtained PCM data per channel, and center energy; and select one of a plurality of sound effects based on the calculated deviation energy and the center energy.

13. The electronic device of claim 12, wherein the controller is configured to compare a value resulting from dividing the center energy by a sum of the deviation energy and the center energy with a first threshold.

14. The electronic device of claim 13, wherein the controller is configured to, if the value of the division is greater than the first threshold, determine the analyzed audio signal comprises a first audio signal, select a first audio mode to be applied to the image data, and apply the selected first audio mode and a video mode that matches the first audio mode to the image data.

15. The electronic device of claim 13, wherein the controller is configured to, if the value of the division is not greater than the first threshold, determine whether the analyzed audio signal corresponds to at least one of other audio signals.

16. The electronic device of claim 12, wherein the controller is configured to
- buffer the obtained PCM data per channel for a predetermined period of time;
- extract a mood value from the buffered PCM data per channel;
- combine the extracted mood value, and a ratio of a center energy to a total energy calculated with the obtained PCM data per channel in a frame; and
- determine whether the analyzed audio signal is at least one of other audio signals or an audio signal from a film by comparing the combined value with a second threshold.

17. The electronic device of claim 12, wherein the controller is configured to integrate or separate the obtained PCM data per channel into two channels.

18. A non-transitory computer-readable storage medium having a program embodied thereon to operate an electronic device, the program including instructions of:
- a first instruction set for storing audiovisual (A/V) data in a memory of the electronic device; and
- a second instruction set for playing back the A/V data stored in the memory, wherein the second instruction set comprises:
- a third instruction set for analyzing an audio signal of the A/V data dynamically;
- a fourth instruction set for selecting one of a plurality of sound effects based on the analyzed audio signal; and
- a fifth instruction set for playing back the A/V data by applying the selected one sound effect to at least a part of the A/V signal, and wherein the fourth instruction set comprises:
- a sixth instruction set for obtaining Pulse Code Modulation (PCM) data per channel by decoding the analyzed audio signal;
- a seventh instruction set for calculating a deviation energy between left and right sides of each frame of the obtained PCM data per channel, and center energy; and
- a eighth instruction set for selecting one of the plurality of sound effects based on the calculated deviation energy and the center energy.

* * * * *